United States Patent
Lee et al.

(10) Patent No.: US 8,688,134 B2
(45) Date of Patent: Apr. 1, 2014

(54) METHOD AND DEVICE FOR RESOURCE ALLOCATION CONTROL IN RADIO COMMUNICATIONS SYSTEM

(75) Inventors: Jinsock Lee, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 781 days.

(21) Appl. No.: 12/110,033

(22) Filed: Apr. 25, 2008

(65) Prior Publication Data

US 2008/0268859 A1 Oct. 30, 2008

(30) Foreign Application Priority Data

Apr. 28, 2007 (JP) ................................ 2007-120377

(51) Int. Cl.
*H04W 72/00* (2009.01)

(52) U.S. Cl.
USPC .............. 455/450; 455/69; 370/331; 370/332

(58) Field of Classification Search
USPC ......................................................... 455/450
See application file for complete search history.

(56) References Cited

U.S. PATENT DOCUMENTS

| | | | |
|---|---|---|---|
| 5,862,487 A | 1/1999 | Fujii et al. | |
| 6,163,700 A * | 12/2000 | Hussain et al. | 455/453 |
| 6,504,837 B1 | 1/2003 | Menzel | |
| 6,693,915 B1 | 2/2004 | Lappetelainen et al. | |
| 6,771,968 B1 | 8/2004 | Heubel | |
| 6,850,764 B1 * | 2/2005 | Patel | 455/450 |
| 7,113,516 B1 * | 9/2006 | Shefi et al. | 370/412 |
| 7,702,351 B2 * | 4/2010 | Soliman | 455/522 |
| 7,924,867 B2 | 4/2011 | Haas et al. | |
| 8,285,294 B2 | 10/2012 | Baldemair et al. | |
| 2002/0068588 A1 * | 6/2002 | Yoshida et al. | 455/461 |
| 2004/0077353 A1 * | 4/2004 | Mahany | 455/448 |
| 2007/0218881 A1 * | 9/2007 | Voyer et al. | 455/414.1 |
| 2009/0111477 A1 | 4/2009 | Tsutsui | |
| 2010/0255850 A1 * | 10/2010 | Kaukoranta et al. | 455/450 |

FOREIGN PATENT DOCUMENTS

| | | |
|---|---|---|
| EP | 1 119 118 A2 | 7/2001 |
| JP | 05-206933 A | 8/1993 |
| JP | 2001-145155 A | 5/2001 |
| JP | 2002-526970 | 8/2002 |

(Continued)

OTHER PUBLICATIONS

3GPP TS 36. 300 V1.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), pp. 1-28 (Mar. 2007).

(Continued)

*Primary Examiner* — George Eng
*Assistant Examiner* — Joseph Dean, Jr.
(74) *Attorney, Agent, or Firm* — Dickstein Shapiro LLP

(57) ABSTRACT

A resource allocation control method and device that can reduce inter-cell interference in a radio communications system are provided. According to a method for resource allocation control between a plurality of cells in a radio communications system, radio communication devices respectively controlling at least two cells notify information about control resources of its own cell to each other. In the resources of its own cell, each of the radio communication devices sets a buffer resource within a predetermined resource range corresponding to a control resource of the other cell. At a request for information transmission in its own cell, each of the radio communication devices restricts the allocation of the set buffer resource.

24 Claims, 15 Drawing Sheets

(56) References Cited

FOREIGN PATENT DOCUMENTS

| JP | 2003-018641 A | 1/2003 |
| JP | 2007-509549 A | 4/2007 |
| JP | 2009-513043 A | 3/2009 |
| WO | WO-2007/039789 A1 | 4/2007 |
| WO | WO-2007/045504 A1 | 4/2007 |

OTHER PUBLICATIONS

Japanese Office Action issued on Feb. 29, 2012 for counterpart Japanese Patent Appl No. 2007-120377 (English translation attached).
Japanese Office Action issued for counterpart application JP 2012-201100, dated Jul. 31, 2013 with English translation.

\* cited by examiner

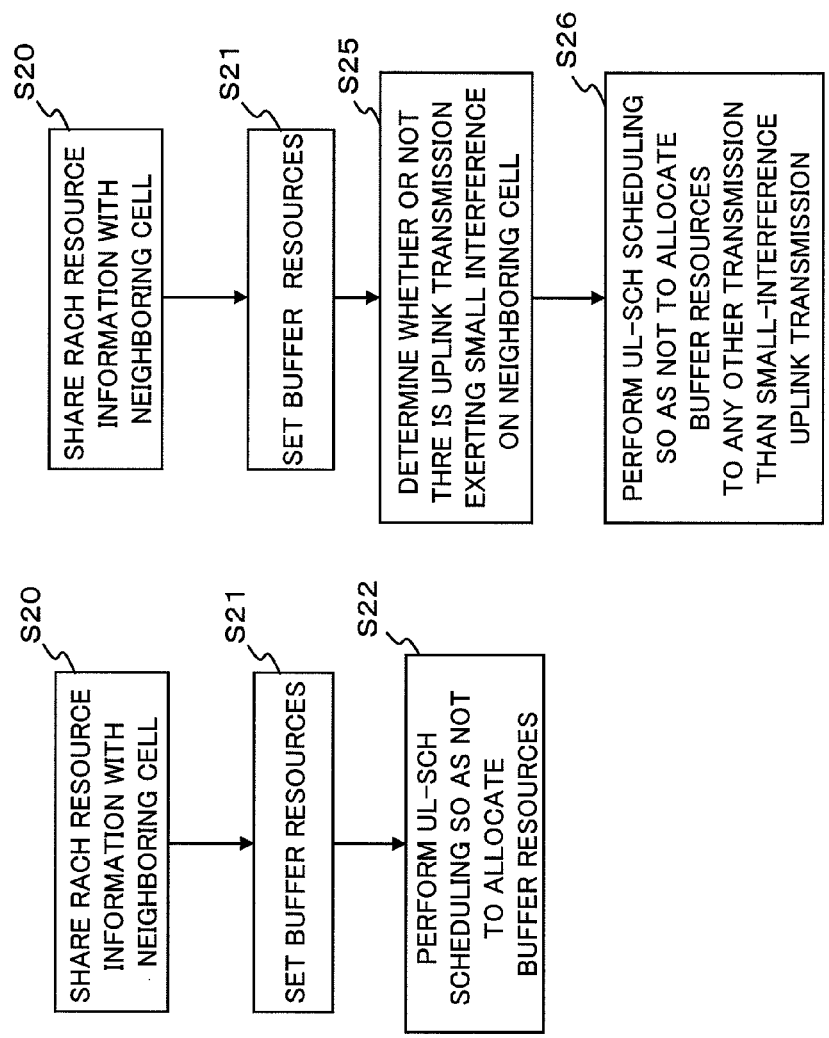

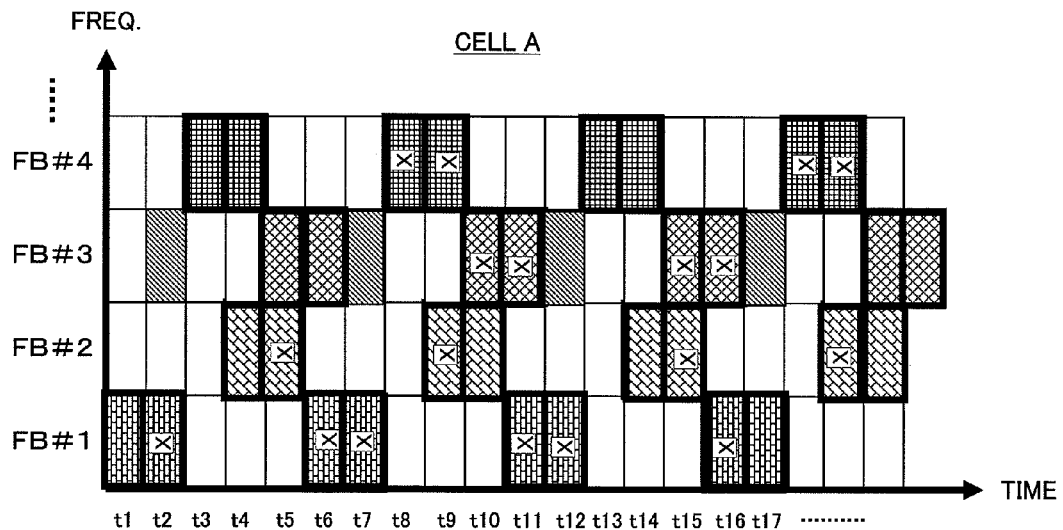
FIG. 7A
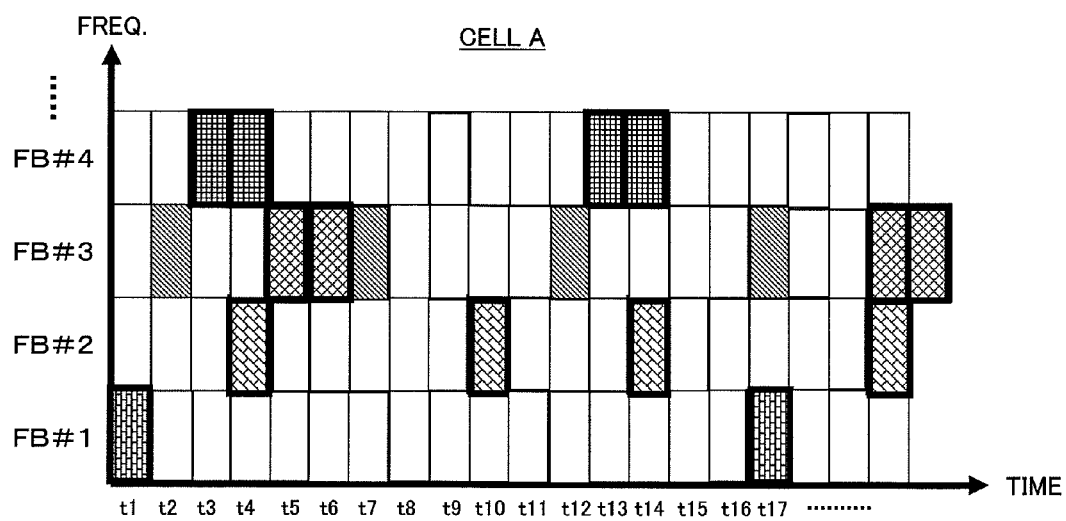
FIG. 7B
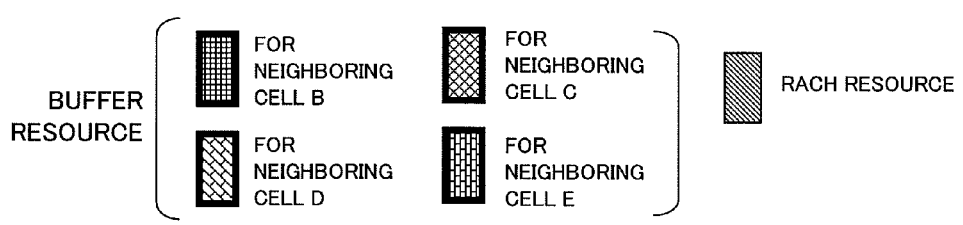

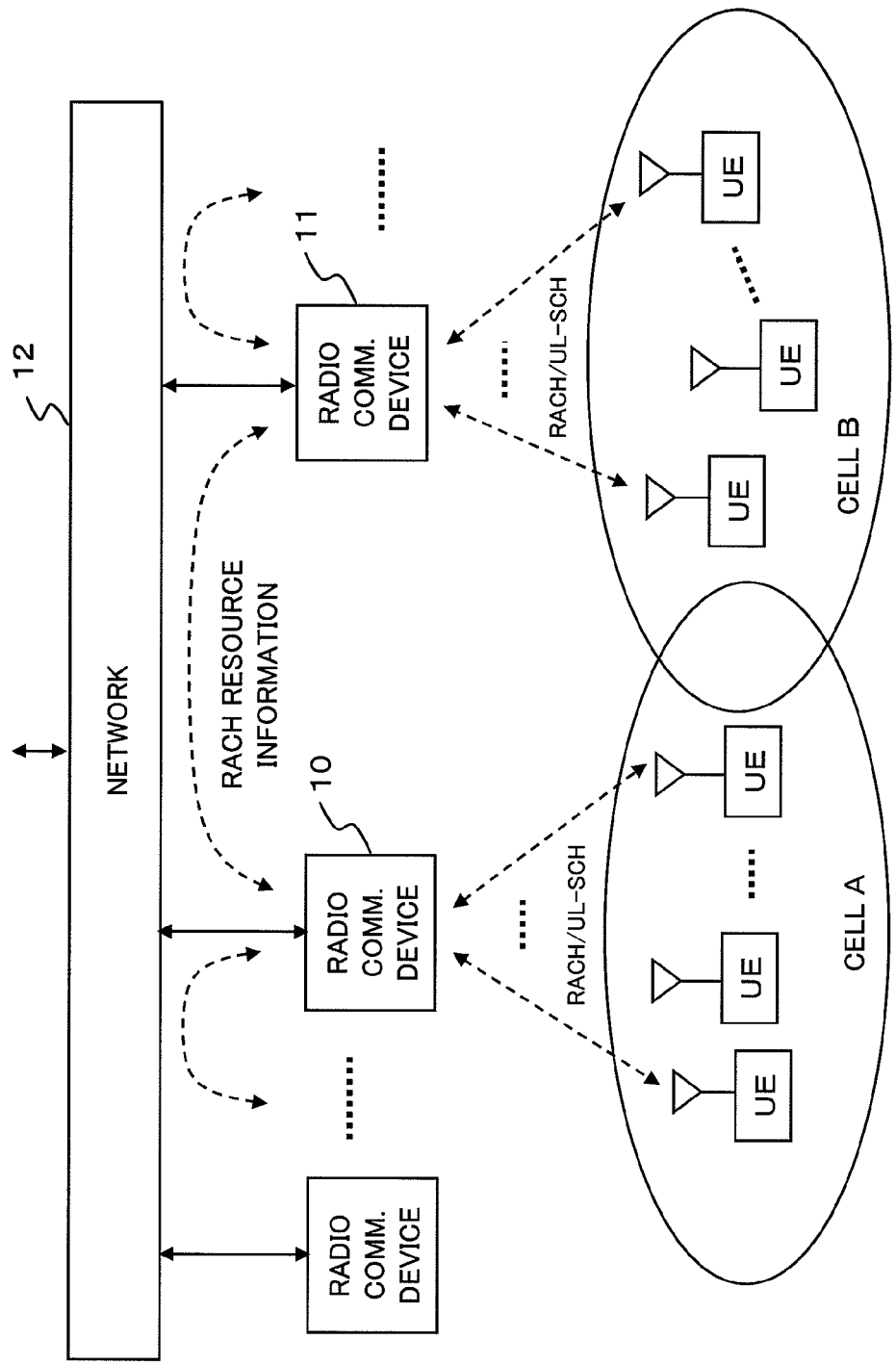

METHOD AND DEVICE FOR RESOURCE ALLOCATION CONTROL IN RADIO COMMUNICATIONS SYSTEM

BACKGROUND OF THE INVENTION

1. Field of the Invention

This application is based upon and claims the benefit of priority from Japanese Patent Application No. 2007-120377, filed on Apr. 28, 2007, the disclosure of which is incorporated herein in its entirety by reference.

The present invention relates to a radio communications system having a plurality of radio zones (hereinafter, referred to as cells) and, more particularly, to a method and device for resource allocation control in the system.

2. Description of the Related Art

In a mobile communications system, for a base station and a mobile station to perform data communication, they need to establish synchronization between them in advance. Since initial access from the mobile station in particular is not always in synchronization, the base station requires some procedure for uplink synchronization with the mobile station.

In LTE (Long Term Evolution), which is being standardized by the 3rd generation partnership project (3GPP), a random access channel (PACH) and an uplink shared channel (UL-SCH) are provided for uplink synchronization and uplink data transmission. The RACH is a channel to transmit a control signal for establishment of uplink synchronization, and further to request a resource for transmission of uplink data. To establish uplink synchronization without a long delay, it is preferable that RACH transmission collision probability be reduced as low as possible (see 3GPP TS 36.300 V.1.0.0, Mar. 19, 2007). On the other hand, the UL-SCH is a channel to transmit data and Layer-2/Layer-3 control packets. Since the transmission power of the UL-SCH in particular increases in accordance with the transmission rate, it is necessary to take account of interference with other signals.

FIG. 1A is a diagram schematically showing a generic structure of a mobile communications system according to the LTE, and FIG. 1B is a resource structure diagram schematically showing radio resources based on both frequency division and time division. Here, a mobile station is labeled "UE", which is an abbreviation of User Equipment. It is assumed that a mobile station UE1 located in a cell A of a base station eNB1 transmits data to the base station eNB1 through UL-SCH, and that a mobile station UE2 located in a cell B of a base station eNB2 transmits a control signal to the base station eNB2 through RACH.

In wideband code division multiple access (WCDMA), RACH and EDCH (Enhanced dedicated Channel) share the same frequency resource, multiplexed by using different spreading and scrambling codes. On the other hand, in the LTE, a plurality of frequency-divided and time-divided resources are shared by RACH and UL-SCH exclusively of each other. Specifically, the LTE uplink has a resource structure in which a system bandwidth of 10 MHz is time-divided into time intervals of 1 msec, each of which is further frequency-divided into widths of 1.25 MHz. Referring to FIG. 1B, each of t1, t2, . . . on the horizontal axis corresponds to a 1-msec-long time resource, and each of FB#1, FB#2, . . . on the vertical axis corresponds to a 1.25-MHz-wide frequency resource. Hereinafter, one rectangular block defined by one time resource and one frequency resource as shown in FIG. 1B will be simply referred to as "resource."

It is each base station eNB that determines how to allocate such system resources to the RACH and UL-SCH. In general, a RACH resource is periodically allocated as shown in FIG. 1B so that a mobile station UE can gain access to the base station eNB without a long delay. It is also possible to allocate a plurality of RACH resources at a time and thereby secure a sufficient RACH access capacity. Each base station eNB generally broadcasts information indicative of which resource(s) is allocated to the RACH. Therefore, in accordance with the broadcast information, every mobile station UE in a cell can gain access to the RACH resource(s) whenever the mobile station UE needs. Within a cell, the RACH and UL-SCH do not directly interfere with each other as long as RACH resources and UL-SCH resources are allocated in accordance with the frequency division and time division shown in FIG. 1B.

However, in the case where different control entities individually perform resource allocation in neighboring cells, there is a possibility that a PACH transmission in one of the cells interferes with an UL-SCH transmission in the other cell. As mentioned above, since each base station eNB, on its own responsibility, individually allocates uplink resources of the cell under its control to the RACH and UL-SCH, there is a case where a high-speed uplink data transmission in a certain cell interferes with a RACH transmission in a neighboring cell. For example, when a call setup procedure is started, the prevention of this RACH interference is particularly important, considering that uplink synchronization needs to be established through RACH transmission. This is because, if the data transmission in the certain cell interferes with the RACH transmission in the neighboring cell, call setup will be delayed in the neighboring cell. This is not limited to the case of call setup. In the case where RACH transmission is required prior to the start of other processing as well, a similar effect is caused: specifically, the processing is delayed due to strong uplink interference of a high-speed uplink data transmission to the RACH transmission.

FIGS. 2A and 2B are schematic diagrams showing an example of inter-cell interference. Here, it is assumed that frequency resources are allocated to the RACH and UL-SCH in each of cells A and B independently, as shown in FIG. 2A. If these cells A and B are as far away from each other as they do not affect each other, interference is not problematic. However, if the cells A and B are neighboring cells as shown in FIG. 1A and the frequency band and timing of data transmission performed by a mobile station UE1 located in the cell A coincide with those of RACH transmission performed by a mobile station UE2 located in the cell B, then the possibility is large that interference as shown in FIG. 2B occurs.

For example, referring to FIG. 2B, when the mobile station UE1 in the cell A desires to transmit data at a certain point of time, the mobile station UE1 first performs RACH transmission using a RACH resource designated by a broadcast signal from the base station eNB1. Then using an UL-SCH resource granted by means of a response from the base station eNB1, the mobile station UE1 starts uplink data transmission. At this time, assuming that the mobile station UE2 similarly starts RACH transmission to transmit data by using a resource that coincides with the UL-SCH used in the cell A, the base station eNB2 cannot detect the RACH transmission from the mobile station UE2, due to interference with the UL-SCH transmission of the mobile station UE1 in the cell A. If no response is received from the base station eNB2, the mobile station UE2 increases transmission power and repeats RACH transmission. After a response (GRANT) is received from the base station eNB2, the mobile station UE2 starts UL-SCH transmission. As described above, the possibility increases that the start of communication of the mobile station UE2 is greatly delayed due to a collision with the UL-SCH transmission.

To avoid such interference, a conceivable method is that a resource that makes the smallest interference is searched for and this smallest-interference resource is allocated to RACH transmission, as described in Japanese Patent Application Unexamined Publication No. 2002-526970, for example. However, according to this method, a RACH resource cannot be allocated periodically, leading to unstable access from a mobile station UE to a base station eNB, resulting in a high possibility of a long delay. Moreover, since a resource making small interference is generally allocated to data transmission, the fact that the smallest-interference resource is allocated to RACH transmission may cause larger interference in reverse, making it easier for collision to occur.

Such a problem concerns not only the LTE, but may exist in general radio communications systems using an access scheme (FTDMA) based on a frequency-divided and time-divided resource structure.

SUMMARY OF THE INVENTION

An object of the present invention is to provide a resource allocation control method and device that can reduce inter-cell interference.

According to the present invention, a method for controlling resource allocation in a plurality of cells, includes: each of radio communication devices which control at least two cells receives information of resources for control used in another cell from its radio communication device; and sets buffer resources in a predetermined resource area of its own cell, wherein each buffer resource is located corresponding to a resource for control used in the other cell.

According to the present invention, in the resources of a cell, a buffer resource is set within a predetermined resource area corresponding to a control resource used in a neighboring cell, whereby inter-cell interference can be reduced.

BRIEF DESCRIPTION OF THE DRAWINGS

FIGS. 3A to 3C are flow charts showing resource allocation control methods according to first to third exemplary embodiments of the present invention, respectively.

FIG. 7A is a resource structure diagram schematically showing buffer resource candidates and persistent-interference avoiding patterns, to describe the resource allocation control method according to the third exemplary embodiment of the present invention.

FIG. 7B is a resource structure diagram showing an example of the allocation of buffer resources to which the resource allocation control method according to the third exemplary embodiment is applied.

FIG. 8 is a block diagram showing a schematic structure of a radio communications system including radio communication devices each including a resource allocation control device according to the present invention.

DETAILED DESCRIPTION OF THE PREFERRED EMBODIMENTS

1. Outline of Exemplary Embodiments

Figure 1A:
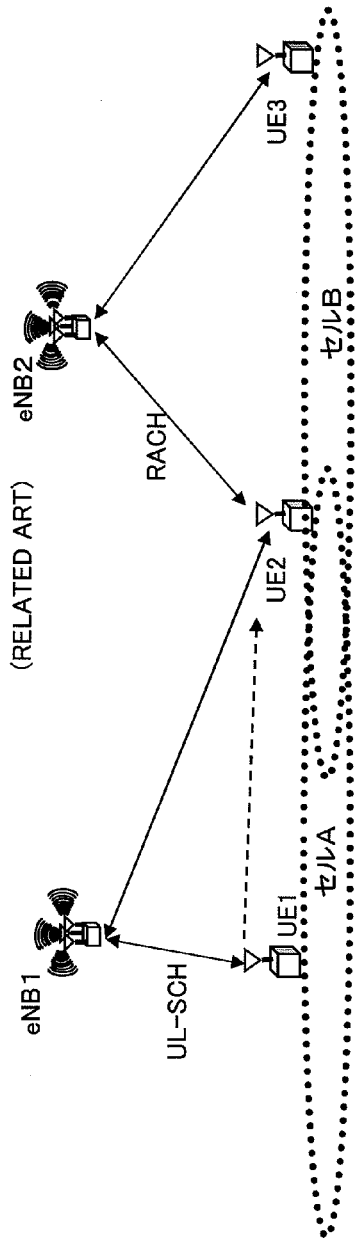
FIG. 1A is a diagram schematically showing a generic structure of a mobile communications system according to the LTE.
Figure 1B:
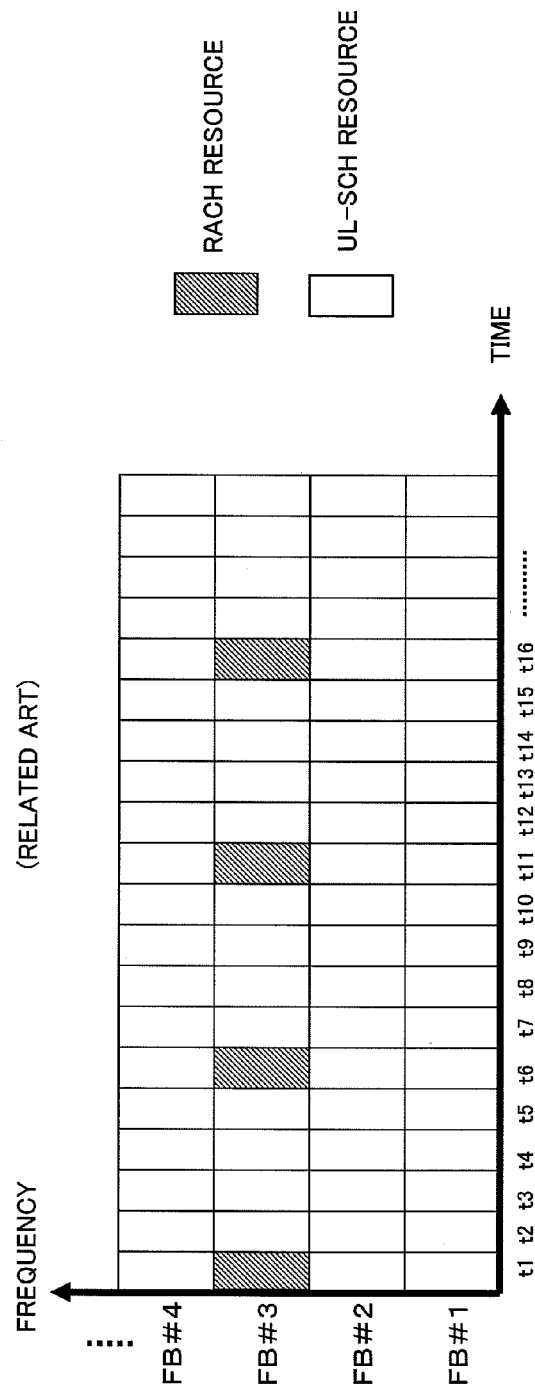
FIG. 1B is a resource structure diagram schematically showing radio resources based on both frequency-division and time-division techniques.
Figure 2A:
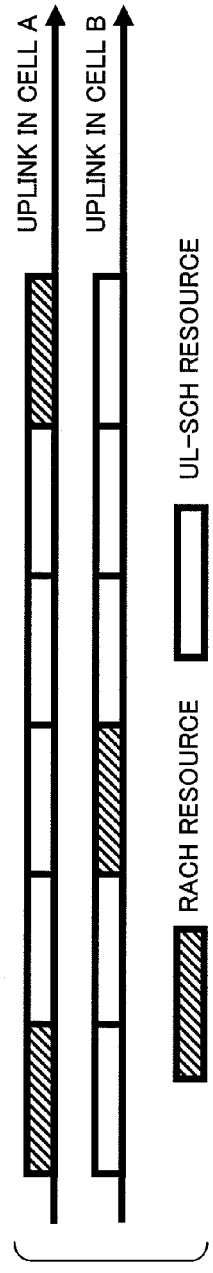
FIGS. 2A and 2B are schematic diagrams showing an example of inter-cell interference.
Figure 2B:
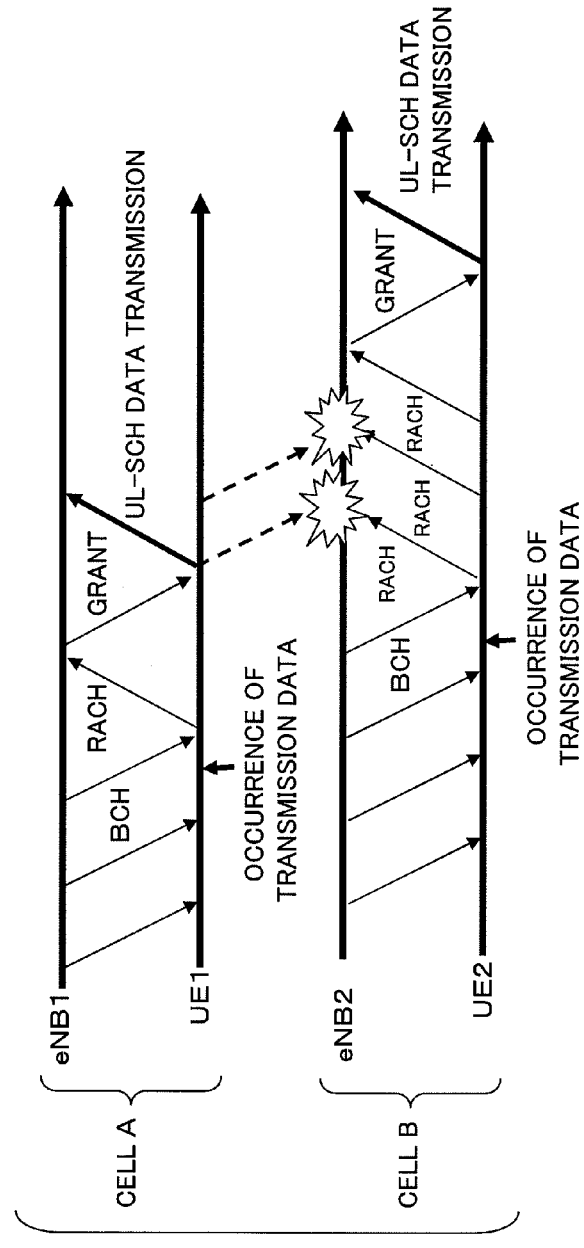

FIGS. 3A to 3C are flow charts showing resource allocation control methods according to first to third exemplary embodiments of the present invention, respectively. Here, to simplify description, it is assumed that two radio communication devices control adjacent cells, respectively, which have a possibility of interference with each other, and that each cell has the resource structure based on the frequency division and time division shown in FIG. 1B. RACH resources of these cells are located by the respective radio communication devices individually. Note, however, that the present invention is applicable not only to LTE-based systems but also to radio communications systems using an access scheme (FT-DMA) based on a frequency-divided and time-divided resource structure.

According to the first exemplary embodiment of the present invention shown in FIG. 3A, the radio communication devices share the RACH usage states of their own cells by exchanging RACH resource information with each other (Step S20). In the resources of its own cell, each radio communication device sets a predetermined resource area corresponding to a RACH resource used by the other radio communication device, as buffer resources (Step S21). Preferably, this predetermined resource area (a buffer resource in the first exemplary embodiment) is a resource area having margin in the frequency direction and/or time direction, with consideration given to variation due to the deviation of frequency, synchronization, and the like between the radio communication devices, which will be described later. Specifically, the predetermined resource area is a resource of its own cell corresponding to a RACH resource of the other cell, or the area of this resource plus those within predetermined bounds from this resource. Each radio communication device performs UL-SCH scheduling while avoiding allocating the buffer resources to the UL-SCH (Step S22). The fact that the buffer resources are not allocated to UL-SCH transmission can prevent interference with a RACH transmission in the cell of the other radio communication device.

According to the second exemplary embodiment of the present invention shown in FIG. 3B, the setting of buffer resources is performed at Steps S20 and S21 as in the first exemplary embodiment. Subsequently, it is determined whether or not there is an UL-SCH transmission exerting small interference on the other radio communication device, that is, whether or not a mobile station UE is present that is performing UL-SCH transmission of which interference falls within an allowable range (Step S25). Each radio communication device performs UL-SCH scheduling so as to permit allocating the buffer resources to this small-interference UL-SCH transmission but so as not to allocate the buffer resources to other UL-SCH transmissions (Step S26). As described above, the buffer resources can be allocated to a UL-SCH transmission that meets a certain condition, whereby resources can be effectively used while inter-cell interference is reduced. Thus, it is possible to reduce a delay in starting uplink communication.

According to the third exemplary embodiment of the present invention shown in FIG. 3C, the radio communication devices first share the RACH usage states of their own cells at Step S20 as in the first exemplary embodiment. Then, in the resources of its own cell, each communication device sets predetermined resource areas corresponding to RACH resources used by the other communication device, as buffer resource candidates (Step S30). Subsequently, each communication device sets buffer resources by non-continuously excluding some of the buffer resource candidates (Step S31). "Non-continuously excluding" means that the buffer resource candidates are not consecutively or persistently excluded but sparsely excluded on an arbitrary pattern, a specific example of which will be described later. In other words, each radio communication device excludes some of the buffer resource candidates of its own cell in accordance with an arbitrary pattern so that interference will not be continuously exerted on a RACH transmission in the neighboring cell. Each radio communication device then performs UL-SCH scheduling so as to suppress the allocation of the buffer resources (Step S32). The suppression of allocation indicates any one of the inhibition of allocation at Step S22 and the conditional inhibition of allocation at Step S26. As described above, some of the buffer resource candidates are non-continuously excluded so that the excluded resources become allocable, whereby resources can be effectively and fairly used while inter-cell interference is reduced, in the case where a plurality of neighboring cells exist. Thus, it is possible to reduce a delay in starting uplink communication.

Specifically, since a buffer resource candidate set for an arbitrary neighboring cell corresponds to a RACH resource of this neighboring cell, buffer resource candidates are generally arranged at constant periods in the time direction. Accordingly, buffer resources can be created by decimating these arranged buffer resource candidates in accordance with a random pattern (or a predetermined pattern) in the time direction. Moreover, if buffer resource candidates for a neighboring cell are present also in the frequency direction, buffer resources can be created by decimating the buffer resource candidates in accordance with a random pattern (or a predetermined pattern) in the frequency direction. Further, if a plurality of neighboring cells exist, it is also possible that buffer resources are created by selecting, in accordance with a random pattern (or a predetermined pattern), a cell for which buffer resource candidates will be thinned. Although fairness can be ensured by selecting a cell at random, the rate of selecting a neighboring cell may be changed, with consideration given to the level of RACH interference in each cell.

2. First Exemplary Embodiment

Figure 4:
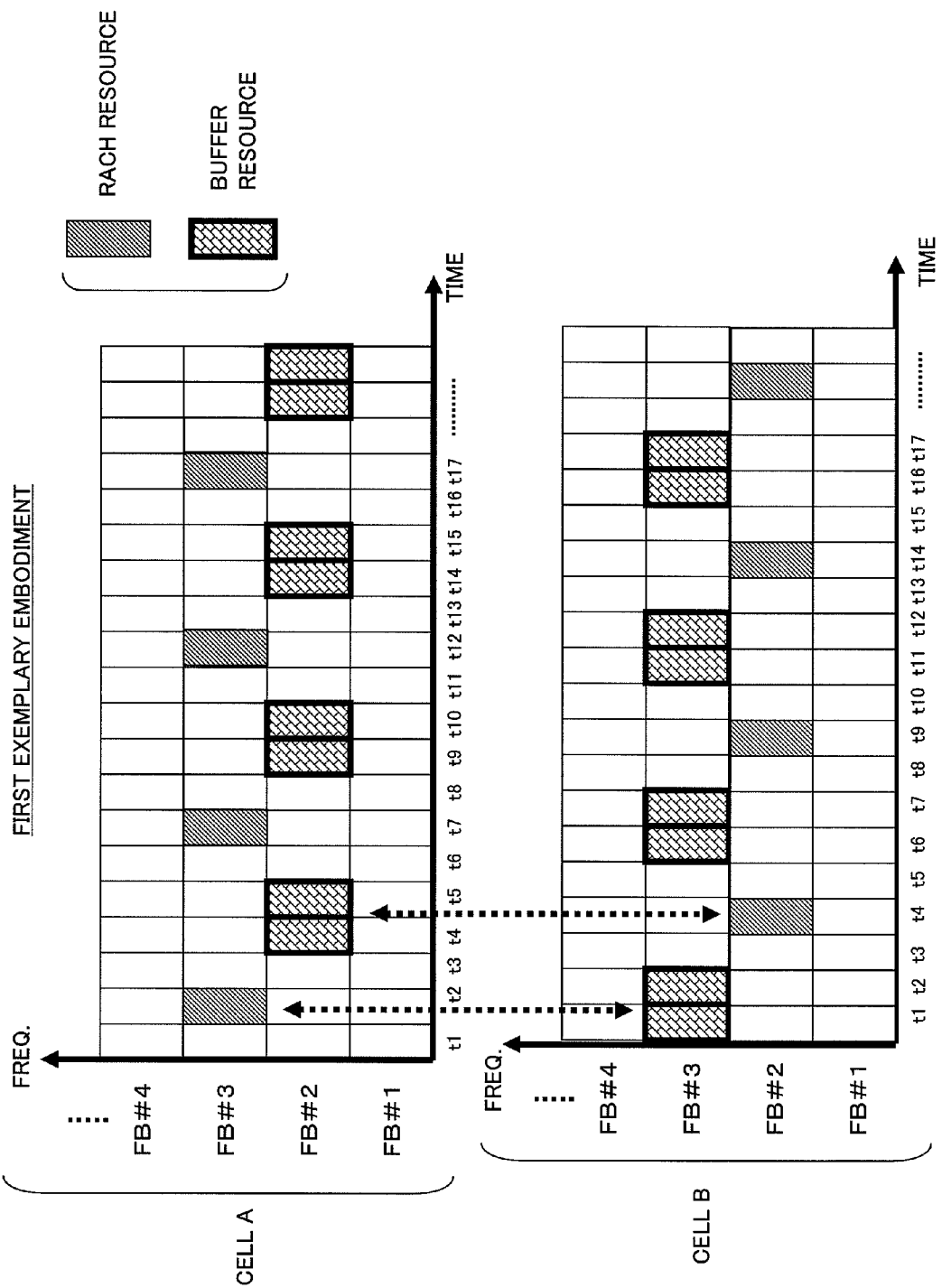
FIG. 4 is a resource structure diagram showing examples of the allocation of RACH resources and UL-SCH resources to which the resource allocation control method according to the first exemplary embodiment of the present invention is applied.

FIG. 4 is a resource structure diagram showing examples of the allocation of RACH resources and UL-SCH resources to which the resource allocation control method according to the first exemplary embodiment of the present invention is applied. Here, it is assumed that cells A and B are not in perfect synchronization in the time domain. That is, with reference to a sequence of the time resources t1, t2, . . . of the cell A, the time resources t1, t2, . . . of the cell B are a little fast in the time direction and do not perfectly coincide with the time resources of the cell A. Therefore, one time resource of one of these cells can span two time resources of the other cell. For example, the time resource t7 of the cell A falls across the time resources t6 and t7 of the cell B.

If the cells A and B are controlled by a single radio communication device and are in perfect synchronization, the locations of the time resources of the two cells should temporally coincide with each other. In the case where the cells A and B are controlled by different radio communication devices respectively, it is sufficient to provide some synchronization means or a well-known synchronization mechanism. For example, the radio communication devices can synchronize their internal clocks with each other by exchanging time information (a transmission frame number or the like) with each other directly or through a mobile station. Alternatively, synchronization between the radio communication devices can be established in accordance with a synchronization protocol of a central station, or high-precision synchronization can also be established by using a global positioning system (GPS). However, in general, with consideration given to variation factors such as signal propagation delays and clock generator variations, it is preferable that two consecutive time resources or, if necessary, three or more consecutive time resources (hereinafter, these consecutive time resources will be referred to as a time resource set) of one of the cells be associated, as buffer resources, with one time resource of the other cell. If one time resource can be further time-divided into sub-resources, the time width of a buffer resource set can be set with smaller granularity.

It is assumed that such cells A and B are adjacent to each other and are in such a positional relationship that an UL-SCH transmission in one of the cells can interfere with a RACH transmission in the other cell. Moreover, it is assumed that in the cell A, the time resources t2, t7, t12, . . . of the frequency resource FB#3 are periodically allocated to RACH transmission, and that in the cell B, the time resources t4, t9, t14, . . . of the frequency resource FB#2 are periodically allocated to RACH transmission. Each radio communication device can acquire knowledge about the locations where RACH resources are allocated in the other cell by exchanging RACH resource information. Therefore, in one of the cells, a resource set (here, two consecutive time resources) corresponding to the location of a RACH resource allocated in the other cell can be set as a buffer resource.

Here, suppose that the location of a resource of each cell is represented by a time-frequency coordinate, like (frequency resource, time resource), and that when a plurality of resources are allocated consecutively, the resources are represented by using a "+" sign. Referring to FIG. 4, a buffer resource set (FB#3, t1+t2) is set in the cell B with respect to a RACH resource (FB#3, t2) of the cell A. Conversely, a buffer resource set (FB#2, t4+t5) is set in the cell A with respect to a RACH resource (FB#2, t4) of the cell B. Similarly thereafter, a buffer resource set is set in one of the cells, with respect to each RACH resource of the other cell.

Incidentally, a reference frequency oscillator is provided for each of the cells A and B, whereby frequency division to obtain the frequency resources FB#1, FB#2, FB#3, . . . is accomplished. Considering variations in these frequencies, it is also preferable to set a buffer resource in which margin is provided also in the frequency direction. For example, with respect to the RACH resource (FB#2, t4) of the cell B, a buffer resource set (FB#2±α, t4+t5) can also be set, which is obtained by extending the corresponding buffer resource set (FB#2, t4+t5) set in the cell A by a predetermined width α in the frequency directions. The predetermined width a may be set equal to or smaller than the width of a frequency resource.

Each of the radio communication devices controlling the cells A and B performs UL-SCH scheduling so as not to allocate the thus-set buffer resources to UL-SCH transmission. Since other resources than the buffer resources are allocated to UL-SCH transmission, interference with a RACH resource of the other cell can be certainly avoided.

3. Second Exemplary Embodiment

Figure 5:
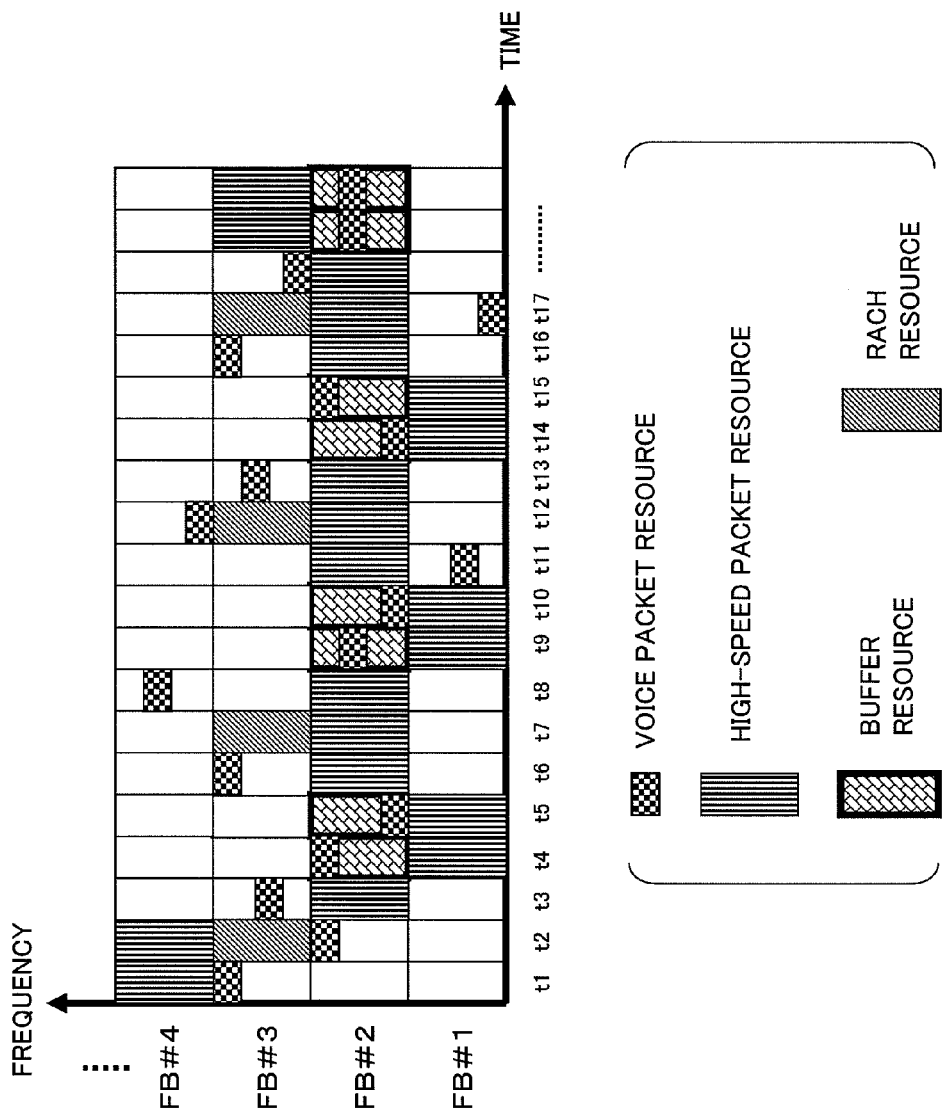
FIG. 5 is a resource structure diagram showing an example of the allocation of RACH resources and UL-SCH resources to which the resource allocation control method according to the second exemplary embodiment of the present invention is applied.

FIG. 5 is a resource structure diagram showing an example of the allocation of RACH resources and UL-SCH resources to which the resource allocation control method according to the second exemplary embodiment of the present invention is applied. Here, to maintain the consistency of description, it is assumed that RACH resources and buffer resources are configured at the same frequency-time locations as the resources of the cell A shown in FIG. 4.

In the second exemplary embodiment as well, the buffer resources are basically not allocated to UL-SCH transmission as described above. However, when the level of interference of an UL-SCH transmission exerted on the other cell is within an allowable range, or can be regarded as in an allowable range, the allocation of the buffer resources to this UL-SCH transmission is exceptionally permitted.

Referring to FIG. 5, buffer resources are set correspondingly to the locations of the RACH resources of the neighboring cell B, which are notified from the cell B. The radio communication device controlling the cell A, if a mobile station UE requesting voice packet transmission (VoIP) is present in the cell A, allocates to the voice packet transmission UL-SCH resources that hop from frequency to frequency (frequency-hop) at each time resource. For example, UL-SCH resources can be allocated to the voice packet transmission at random all over the frequency resources so that the frequency diversity gain becomes the largest.

When resources are allocated to the voice packet transmission, if a time resource includes a buffer resource (here, t4, t5, t9, t10, . . . ), it is preferable that the buffer resource be allocated preferentially to the voice packet transmission in question. This is because, since voice packet transmission requires a relatively narrow bandwidth and low transmission power, no great interference is exerted on another cell even if a buffer resource is allocated to voice packet transmission. Thus, resources to be allocated to high-speed UL-SCH transmission can be spared. In the example shown in FIG. 5, different frequency bands in the buffer resources (FB#2, t4) and (FB#2, t5) are allocated to the voice packet transmission, which requires low power. However, since it should be avoided to consecutively allocate buffer resources to voice packet transmissions of a plurality of mobile stations, it is preferable to predetermine the upper limit of allocable sub-resources in one buffer resource.

4. Third Exemplary Embodiment

Figure 6:
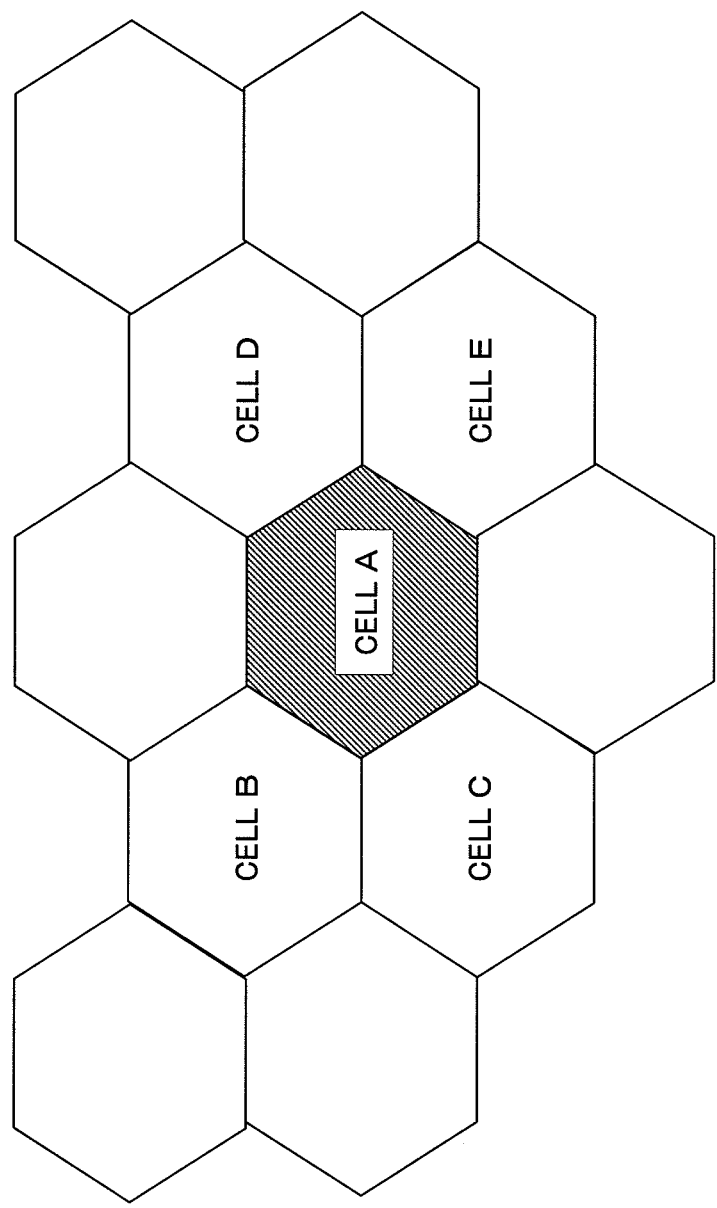
FIG. 6 is a diagram showing an example of a cell structure in the case where a plurality of neighboring cells exist.

FIG. 6 is a diagram showing an example of a cell structure in the case where a plurality of neighboring cells exist. FIG. 7A is a resource structure diagram schematically showing buffer resource candidates and consecutive-interference avoiding patterns, to describe the resource allocation control method according to the third exemplary embodiment of the present invention. FIG. 7B is a resource structure diagram showing an example of the allocation of buffer resources to which the resource allocation control method of the present exemplary embodiment is applied. Here, to maintain the consistency of description, it is assumed that RACH resources are located at the same frequency-time locations as the RACH resources of the cell A shown in FIG. 4.

First, referring to FIG. 6, a plurality of cells exists around a cell A. Here, it is assumed that interference can occur between the cell A and any one of the neighboring cells B, C, D, and E. In such circumstances, the cell A shares RACH resource information with the neighboring cells, whereby buffer resources are set in the cell A for each of the cells B to E as shown in FIG. 7A. In the case where the number of neighboring cells is large as in this case, a large proportion of the resources that the cell A can use is occupied by the buffer resources, resulting in reduced capacity in the cell A. In this example, since a RACH resource is allocated every five resources in each of the cells B to E, the sum of the buffer resources corresponding to these RACH resources comes to 40% of all usable resources. According to the foregoing second exemplary embodiment, such buffer resources can be allocated to a mobile station performing low-speed data transmission or the like but cannot be allocated to a mobile station performing high-speed data transmission that causes interference to a neighboring cell. Since the effective capacity is reduced in each cell as described above, the capacity in the entire network is resultantly reduced.

According to the third exemplary embodiment, a pattern (marked with "x" in FIG. 7A) that non-continuously excludes some of the buffer resource candidates for each of the cells B to E shown in FIG. 7A (a continuous interference avoiding pattern to avoid persistent or consecutive interference) is applied, and in accordance with this continuous-interference avoiding pattern, buffer resources are determined for each cell as shown in FIG. 7B, for example. Each of the radio communication devices controlling the cells can determine what pattern to use autonomously or by exchanging information with the other radio communication devices.

A preferred example of the continuous interference avoiding pattern is a random pattern that excludes some of the buffer resource candidates at a certain rate. The probability is high that those resources excluded from the buffer resource candidates are allocated to high-speed data transmission, resulting in interference occurring. However, since the resources are excluded at random, interference occurs only with part of a RACH transmission, and persistent or consecutive interference can be effectively avoided. Moreover, the use of random patterns also brings the advantage that the probabilities of occurrence of partial interference with the cells B to E become even among the cells B to E.

Note that, even with a random pattern, it is possible to set the proportion of resources to be excluded, the distribution of period, and the distribution of the width of a buffering area. It is also possible to select an appropriate random pattern, depending on the RACH interference state of a neighboring cell.

The continuous-interference avoiding pattern may be a predetermined pattern, not a random pattern. Next, predetermined patterns will be described, by taking the consecutive-interference avoiding patterns shown in FIG. 7A as examples.

1) Pattern I

As shown at the buffer resources for the neighboring cell B, every other one of the buffer resource candidate sets based on RACH resource information is left (or eliminated). More specifically, buffer resource candidate sets (FB#4, t3+t4), (FB#4, t8+t9), (FB#4, t13+t14), ... are initially set. In accordance with a pattern that excludes (or leaves) every other one of them, the resource sets (FB#4, t3+t4), (FB#4, t13+t14), ... shown in FIG. 7B are ultimately set as buffer resources. According to the pattern in this example, a buffering area has a period of ten resources, a width of two resources, and a remaining-area rate of ½.

2) Pattern II

As shown at the buffer resources for the neighboring cell C, every third one of the buffer resource candidate sets based on PACH resource information is left (in other words, two sets are eliminated and then one set is left and then two sets are eliminated and so on). More specifically, buffer resource candidate sets (FB#3, t5+t6), (FB#3, t10+t11), (FB#3, t15+t16), ... are initially set. In accordance with a pattern that leaves every third one of them, the resource sets (FB#3, t5+t6), ... shown in FIG. 7B are ultimately set as buffer resources. According to the pattern in this example, a buffering area has a period of fifteen (15) resources, a width of two resources, and a remaining-area rate of ⅓.

3) Pattern III

As shown at the buffer resources for the neighboring cell D, among the buffer resource candidate sets based on RACH resource information, a set in which the first resource is left (or eliminated) and a set in which the second resource is left (or eliminated) are alternated. More specifically, buffer resource candidate sets (FB#2, t4+t5), (FB#2, t9+t10), (FB#2, t14+t15), ... are initially set. In accordance with a pattern that alternates the locations of resources to leave between the first resource of a set and the second resource of a set, the resources (FB#2, t4), (FB#2, t10), (FB#2, t14), ... shown in FIG. 7B are ultimately set as buffer resources. According to the pattern in this example, a buffering area has a period of four or six resources, a width of one resource, and a remaining-area rate of ½.

4) Pattern IV

As shown at the buffer resources for the neighboring cell E, among the buffer resource candidate sets based on RACH resource information, a set in which the first resource is left (or eliminated) and a set in which the second resource is left (or eliminated) are switched at every third set, and the other unconcerned buffer resource candidate sets are all eliminated. More specifically, buffer resource candidate sets (FB#1, t1+t2), (FB#1, t6+t7), (FB#1, t11+t12), ... are initially set. In accordance with a pattern that switches at every third set the locations of resources to leave between the first resource of a set and the second resource of a set and that eliminates all the other resources, the resources (FB#1, t1), (FB#1, t17), ... shown in FIG. 7B are ultimately set as buffer resources. According to the pattern in this example, a buffering area has a period of fourteen (14) or sixteen (16) resources, a width of one resource, and a remaining-area rate of ¼.

The above-described patterns I to IV, which are examples, can be used as individually characteristic patterns because they have different periods, widths and remaining-area rates. Accordingly, it is possible to select and apply one of such a plurality of characteristic patterns to all neighboring cells, or to apply a different pattern to each cell as in the example shown in FIGS. 7A and 7B. In addition, it is also possible to select and apply one of these predetermined patterns I to IV at random to each cell.

Moreover, the continuous-interference avoiding pattern is not only applicable in the time domain as shown in FIGS. 7A and 7B but also applicable in the frequency domain and the cell domain. In the case of using a random pattern, by randomization in the time domain, buffer resources for a neighboring cell are set so as to avoid consecutive interference in the time domain as described above. In a cell having a plurality of buffer resources in one time resource, buffer resources for a neighboring cell are set so as to avoid persistent interference in the frequency domain, by randomization in the frequency domain or the combination of randomization in the frequency domain and randomization in the time domain. In addition, in the case where a plurality of neighboring cells exist, buffer resources for each neighboring cell are set so as to avoid continuous interference, by randomization in the cell domain, which is accomplished by determining which cell to select by using a random pattern. It is also possible to combine randomization in the frequency domain and/or randomization in the time domain with randomization in the cell domain.

For example, in the GSM (Global System for Mobile communications) scheme, randomization can be performed in the time domain and/or the cell domain. In the WCDMA or LTE, it is possible to combine any of randomization in the cell domain, randomization in the frequency domain, and randomization in the time domain.

Note that although interference cannot be completely eliminated by using a continuous-interference avoiding pattern, it is possible to ease interference by making the same placement of RACH resources in the time and frequency domains among neighboring cells through communications between the radio communication devices controlling the neighboring cells. This is because, in this case, the RACH can be prevented from interfering with the UL-SCH, and further because, since the RACH has a low probability of transmission, intra-cell collision or inter-cell interference is relatively hard to occur.

EXAMPLES

5. System Structure

FIG. 8 is a block diagram showing a schematic structure of a radio communications system including radio communication devices implementing the present invention. Here, it is assumed that a plurality of radio communication devices including radio communication devices 10 and 11 are communicably connected to each other through a network 12. In addition, it is assumed that the radio communication devices 10 and 11 control cells A and B respectively, and that each of the cells A and B has the resource structure shown in FIG. 4. Each radio communication device performs UL-SCH scheduling by adopting any one of the resource allocation control methods according to the above-described first to third exemplary embodiments.

The plurality of radio communication devices connected through the network 12 may be included in a single base station eNB, or each radio communication device may be a single base station eNB. In any case, when a plurality of mobile stations UE perform RACH transmission or UL-SCH transmission in the cell A or B, interference with a neighboring cell is reduced according to any of the exemplary embodiments. Hereinafter, the configurations and operations of a radio communication device and a mobile station will be described.

5.1) Radio Communication Device

Figure 9:
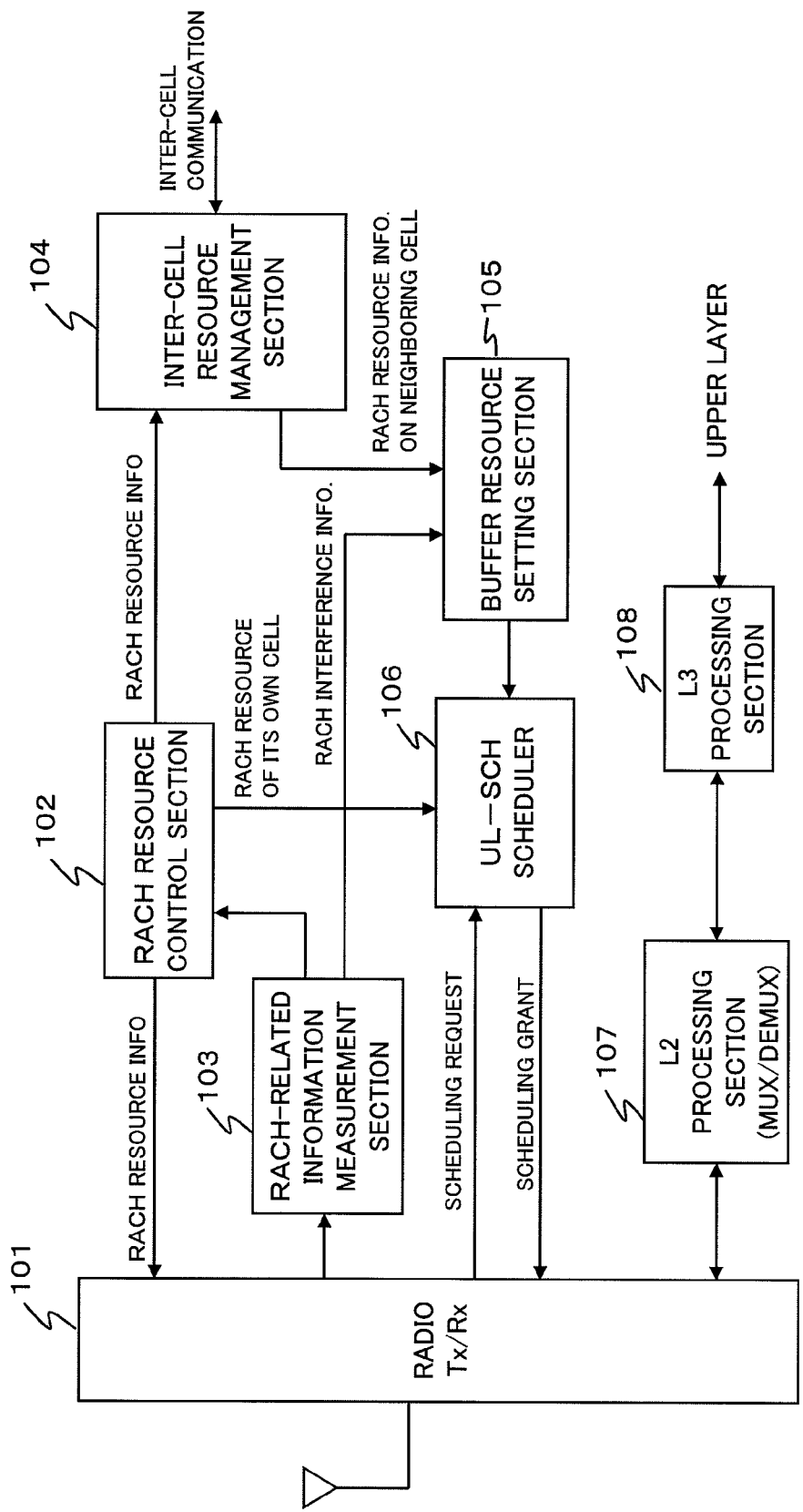
FIG. 9 is a block diagram showing a configuration of a radio communication device including the resource allocation control device according to the present invention.

FIG. 9 is a block diagram showing a configuration of a radio communication device including a resource allocation control device according to the present invention. The radio communication device has a radio transceiver 101 as a physical-layer device that communicates by radio with a plurality of mobile stations. The radio transceiver 101 broadcasts RACH resource information designated by a RACH resource control section 102 through a broadcast channel (BCH), whereby each mobile station becomes capable of RACH transmission.

A RACH-related information measurement section 103 detects at least one of the number of times RACH access is gained, access delay, reception power, and the like with respect to a plurality of mobile stations, thereby measuring the level of RACH interference or the load of RACH access in its own cell.

An inter-cell resource management section 104 receives RACH resource information from each of the radio communication devices controlling neighboring cells and transmits RACH resource information of its own cell designated by the RACH resource control section 102 to each of the radio communication devices controlling the neighboring cells. The received RACH resource information on each neighboring cell is output to a buffer resource setting section 105. The buffer resource setting section 105 receives as input RACH interference information from the RACH-related information measurement section 103 if needed, determines buffer resources for each neighboring cell as described in any one of the foregoing exemplary embodiments, and then outputs the determined buffer resources to an UL-SCH scheduler 106.

According to the first exemplary embodiment, the UL-SCH scheduler 106, upon receipt of a scheduling request from a mobile station located in its own cell to schedule a UL-SCH transmission, allocates usable resources except the RACH resources of its own cell and the buffer resources, and responds to the mobile station with GRANT (scheduling grant). However, according to the second exemplary embodiment, the scheduler 106 can allocate the buffer resources to the UL-SCH transmission if a service requested by the mobile station is of a type requiring low transmission power such as VoIP, or the mobile station has a large path loss with respect to each neighboring cell.

When the thus-allocated UL-SCH resources are notified to the mobile station, the mobile station in question starts data transmission or L2/L3 control packet transmission by using the UL-SCH resources. A L2 processing section 107 and a L3 processing section 108 of the radio communication device perform processing of received uplink data, in according with protocols on their respective layers.

Note that functions similar to the RACH resource control section 102, RACH-related information measurement section 103, inter-cell resource management section 104, buffer resource setting section 105, and UL-SCH scheduler 106 can also be implemented by executing respective programs on a program-controlled processor or computer.

5.2) Mobile Station

Figure 10:
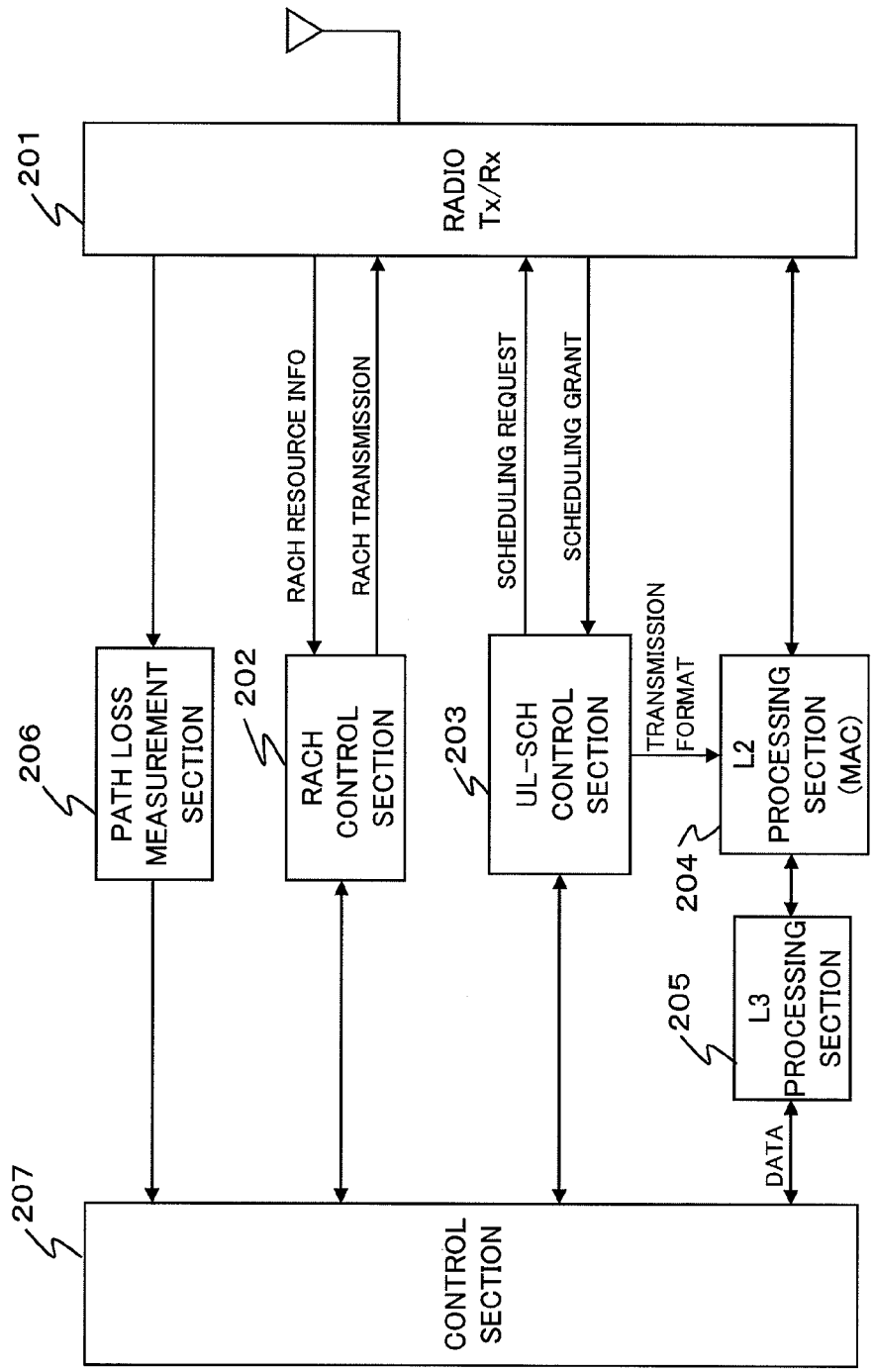
FIG. 10 is a block diagram showing a configuration of a mobile station shown in FIG. 8.

FIG. 10 is a block diagram showing a configuration of a mobile station shown in FIG. 8. The mobile station UE has a radio transceiver 201 as a physical-layer device that communicates by radio with a base station eNB or radio communication device. The radio transceiver 201 receives RACH resource information broadcast from a radio communication device and outputs the received information to a RACH control section 202. In accordance with the received RACH resource information, the RACH control section 202 performs RACH transmission through the radio transceiver 201 at the time of out-of-synchronization or upon occurrence of transmission data. The RACH control section 202 establishes uplink synchronization by receiving a response to this RACH transmission from the radio communication device.

An UL-SCH control section 203 generates a scheduling request upon occurrence of data and transmits the scheduling request through the radio transceiver 201. Upon receipt of a scheduling grant from the radio communication device as a response to the scheduling request, the UL-SCH control section 203 outputs a transmission format to a L2 processing section 204, which then transmits transmission data input from a L3 processing section 205, through the radio transceiver 201 by using allocated UL-SCH resources.

Additionally, the mobile station UE may also be provided with a path loss measurement section 206. The path loss measurement section 206 can estimate a path loss with respect to a neighboring cell by measuring the reception quality of a downlink pilot signal from the neighboring cell. Information about this path loss with respect to the neighboring cell is reported, under control of a control section 207, to the radio communication device, which uses the information to determine whether or not to permit the allocation of buffer resources, according to the above-described second exemplary embodiment. Incidentally, the control section 207 controls the overall operation of the mobile station UE including the RACH control section 202 and the UL-SCH control section 203.

6. Operation

Figure 11:
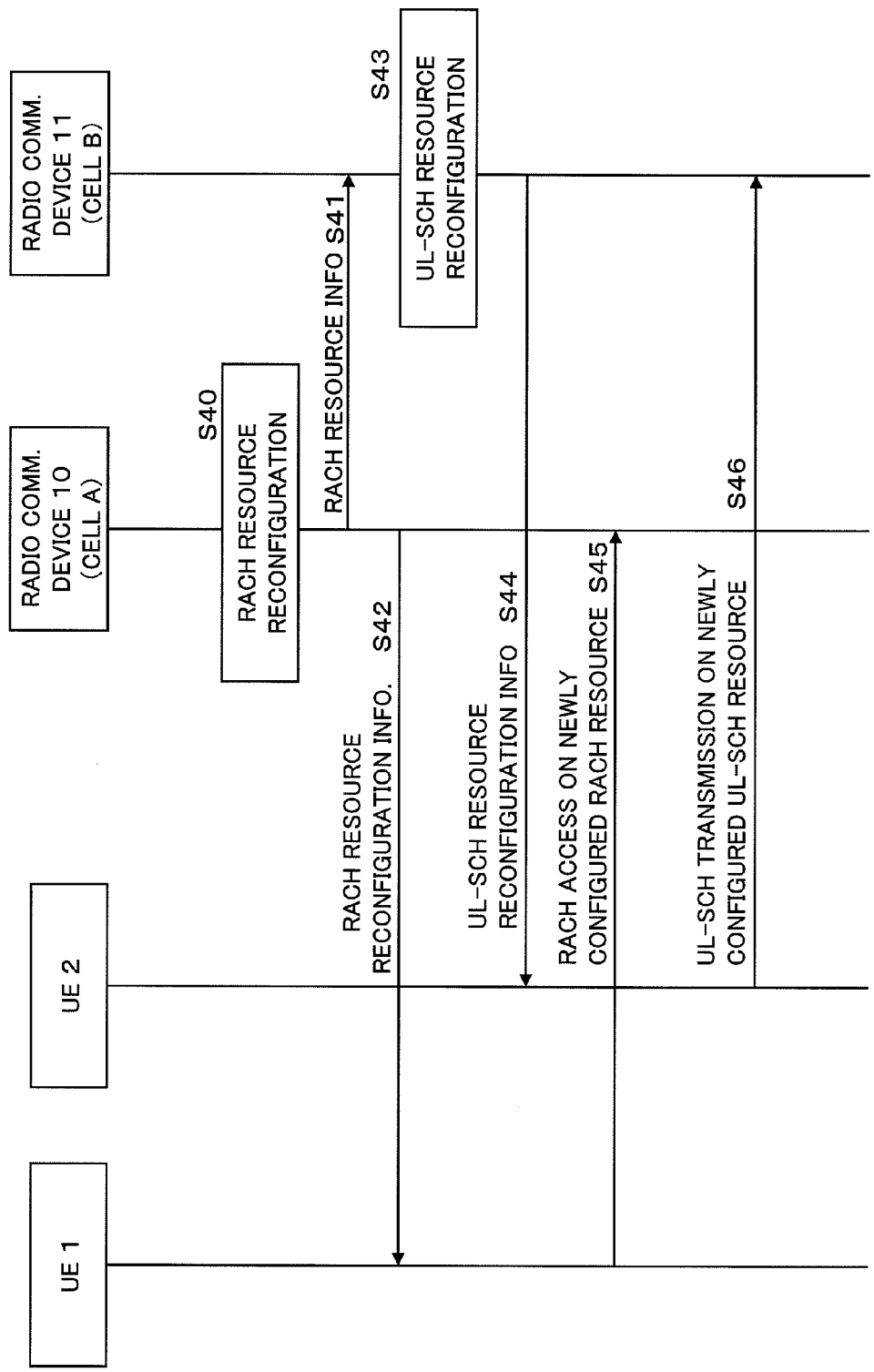
FIG. 11 is a sequence diagram showing operations for resource replacement in the radio communications system shown in FIGS. 8 to 10.

FIG. 11 is a sequence diagram showing operations for resource replacement in the radio communications system shown in FIGS. 8 to 10. First, when the RACH resource control section 102 of the radio communication device 10 controlling the cell A has reconfigured RACH resources (Step S40), the inter-cell resource management section 104 notifies newly reconfigured RACH resource information to the radio communication device 11 controlling the neighboring cell B (Step S41), and further notifies the information to a mobile station UE1 located in the cell A through the radio transceiver 101 (Step S42).

The inter-cell resource management section 104 of the radio communication device 11 controlling the neighboring cell B, upon knowing that the RACH resources of the neighboring cell A have been changed, outputs the new RACH resource information on the neighboring cell A to the buffer resource setting section 105, which then determines buffer resources as in any one of the foregoing exemplary embodiments. The UL-SCH scheduler 106 reconfigures (schedules) UL-SCH resources based on the RACH resources of its own cell B and the buffer resources for the neighboring cell A (Step S43), and notifies new UL-SCH resource information to a mobile station UE2 that is located in the cell B and is performing UL-SCH transmission (Step S44).

The mobile station UE1 that has received the newly reconfigured RACH resource information carries out RACH access by using the newly reconfigured RACH resources (Step S45). The mobile station UE2 that has received the newly reconfigured UL-SCH resource information carries out UL-SCH transmission by using the newly reconfigured UL-SCH resources (Step S46). As described earlier, the UL-SCH transmission of the mobile station UE2 is performed using a different frequency band or at different timing from those of the PACH resources used by the mobile station UE1. Alternatively, interference of the UL-SCH transmission of the mobile station UE2 with the RACH transmission of the mobile station UE1 is at an allowable level. Accordingly, the probability is reduced that a large delay occurs in the mobile station UE1's establishing uplink synchronization.

Note that, although shown here is the case where RACH resource information is notified from the radio communication device 10 to the radio communication device 11, RACH resource information is notified also from the radio communication device 11 to the radio communication device 10. In this case as well, basic operations are as described above, and therefore description thereof will be omitted. Hereinafter, operations according to the exemplary embodiments of the present invention will be described on the assumption, as an example, that a radio communication device is a base station eNB.

7. Operation of First Exemplary Embodiment

Figure 12:
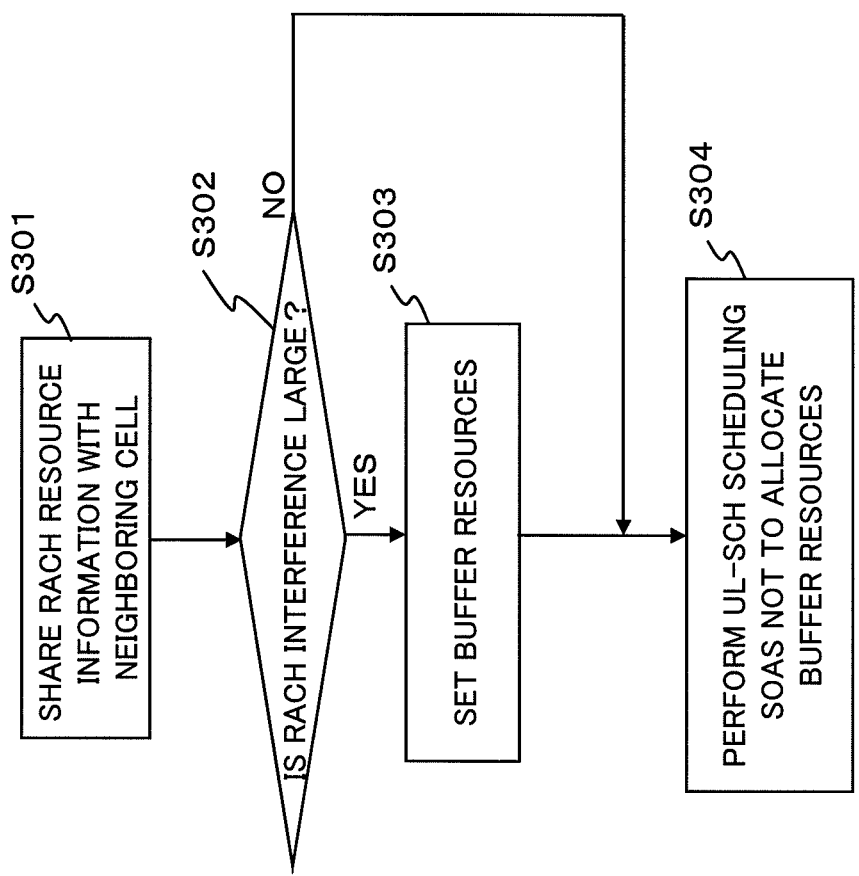
FIG. 12 is a flow chart showing the resource allocation control method according to the first exemplary embodiment of the present invention.

FIG. 12 is a flow chart showing the resource allocation control method according to the first exemplary embodiment of the present invention. Base stations eNB respectively controlling neighboring cells share RACH resource information on the respective cells with each other, by each base station eNB reporting, through the RACH resource control section 102, RACH scheduling information and currently occupied RACH resources to the other base station eNB (Step S301). Subsequently, the buffer resource setting section 105 of each base station eNB determines whether or not the level of RACH interference obtained from the RACH-related information measurement section 103 is larger than a predetermined threshold value (Step S302). When the level of RACH interference is larger (Step S302: YES), the buffer resource setting section 105 sets buffer resources for its neighboring cell, based on the RACH resource information on the neighboring cell in question (Step S303). The UL-SCH scheduler 106 performs scheduling so as not to allocate the buffer resources to UL-SCH transmission, that is, so as to allocate to UL-SCH transmission other resources than the buffer resources and than the RACH resources of its own cell (Step S304). If the level of RACH interference is smaller (Step S302: NO), the UL-SCH scheduler 106 performs scheduling so as to allocate other resources than the RACH resources of its own cell to UL-SCH transmission, without setting buffer resources (step 304).

8. Operation of Second Exemplary Embodiment

According to the second exemplary embodiment, a base station eNB operates as follows.

The base station eNB reports RACH scheduling information currently in use to a neighboring cell.

The base station eNB sets resources corresponding to the RACH resources and nearby resources of the neighboring cell, as uplink buffer resources. These uplink buffer resources can be used by a VoIP mobile station UE, or a mobile station UE that is located around the center of the cell and therefore has high path loss to the neighboring cell.

More specifically, RACH and UL-SCH resource allocation control between cells is performed as follows.

Figure 13:
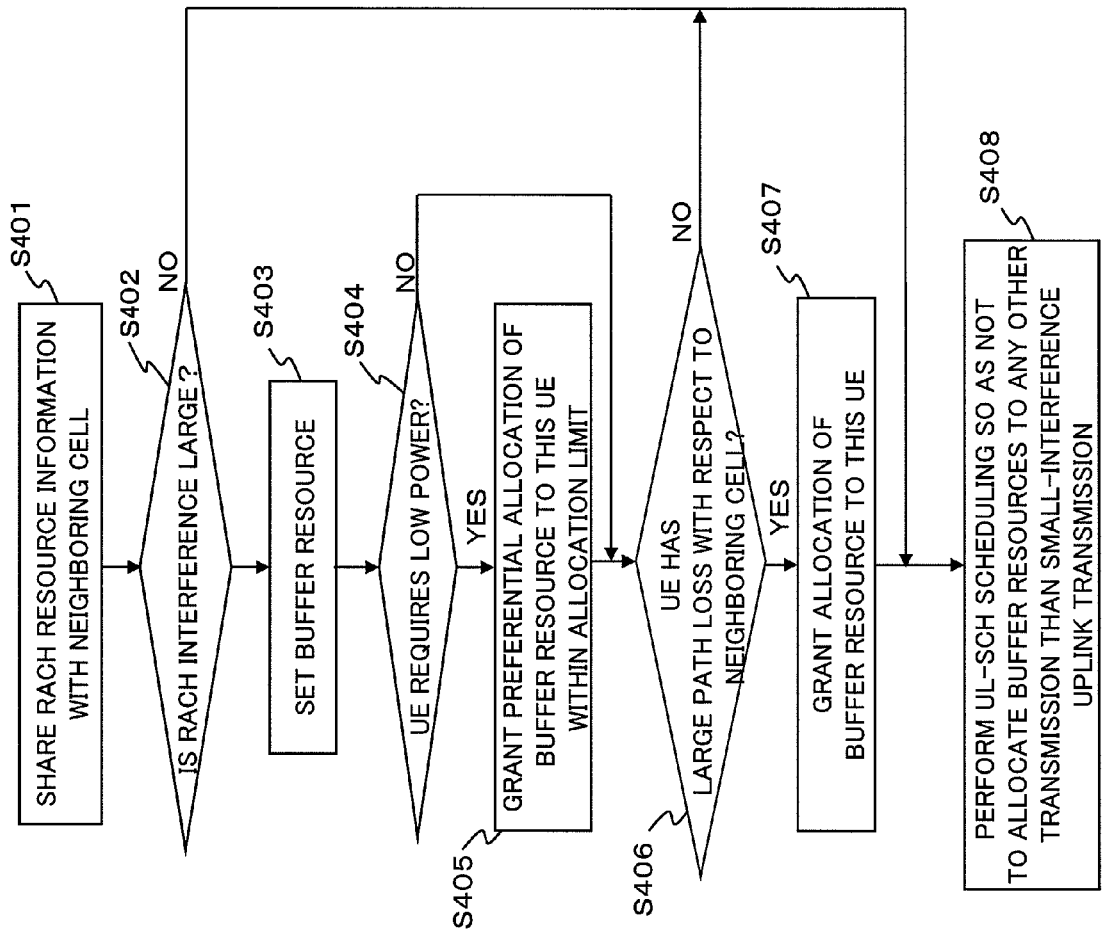
FIG. 13 is a flow chart showing the resource allocation control method according to the second exemplary embodiment of the present invention.

FIG. 13 is a flow chart showing the resource allocation control method according to the second exemplary embodiment of the present invention. Base stations eNB respectively controlling neighboring cells share RACH resource information on the respective cells with each other, by each base station eNB reporting, through the RACH resource control section 102, RACH scheduling information and currently occupied RACH resources to the other base station eNB (Step S401). Subsequently, the buffer resource setting section 105 of each base station eNB determines whether or not the level of RACH interference obtained from the RACH-related information measurement section 103 is larger than a predetermined threshold value (Step S402). When the level of RACH interference is larger (Step S402: YES), the buffer resource setting section 105 sets buffer resources for its neighboring cell based on the RACH resource information on the neighboring cell in question and outputs the buffer resources to the UL-SCH scheduler 106 (Step S403).

Subsequently, the UL-SCH scheduler 106 determines whether or not a mobile station UE that has sent a scheduling request is one requiring low transmission power (here, assumed to be a VoIP mobile station UE performing VoIP packet transmission), based on the scheduling request (Step S404). When the mobile station UE in question is a VoIP mobile station UE (Step S404: YES), the UL-SCH scheduler 106 allocates to the VoIP packet transmission UL-SCH resources that frequency-hop at each time resource. However, at a time resource where a buffer resource is set, the UL-SCH scheduler 106 permits the preferential allocation of this buffer resource, within a predetermined upper limit of allocation (Step S405). Preferably, resources are allocated to the VoIP packet transmission at random all over the frequency resources so that the frequency diversity gain becomes the largest. Step S405 is skipped when the mobile station UE in question is neither a VoIP mobile station UE nor a mobile station UE that is located around the center of the cell and has high path loss to the neighboring cell (Step S404: NO).

Subsequently, the UL-SCH scheduler 106 determines, based on information about the path loss to the neighboring cell reported from the mobile station UE, whether or not the mobile station UE in question has high path loss to the neighboring cell (Step S406). Note that, not only as to whether or not the path loss to the neighboring cell is high, determination may also be made as to whether or not the ratio between the path loss to the current cell and the path loss to the neighboring cell is high. When the mobile station UE has high path loss to the neighboring cell (Step S406: YES), the UL-SCH scheduler 106 permits the allocation of the buffer resources to the transmission of this mobile station UE because interference with the neighboring cell is small (Step S407). Step S407 is skipped when the path loss to the neighboring cell is small (Step S406: NO).

In this manner, the UL-SCH scheduler 106 performs scheduling so as not to allocate the buffer resources to any other transmissions than a UL-SCH transmission that is given an allocation grant at Step S405 or Step S407 (Step S408). Incidentally, when the level of RACH interference is smaller (Step S402: NO), the UL-SCH scheduler 106 performs ordinary UL-SCH scheduling without carrying out Steps S403 to S407.

An example of the above-described resource allocation control will be shown next. First, a base station eNB controlling a cell shares the locations of RACH resources in the time and frequency domains with a base station eNB controlling a neighboring cell. The allocation of buffer resources corresponding to the RACH resources of the neighboring cell is performed as follows.

The base station eNB allocates the buffer resources to, for example, a mobile station UE that is located around the center of the cell and therefore has high path loss to the neighboring cell (however, the mobile station UE needs to have a function of reporting the path loss to the neighboring cell to the current serving cell). This corresponds to a processing flow of "NO" at Step S404, then "YES" at Step S406, then Step S407, and then Step S408.

Alternatively, the base station eNB allocates the buffer resources to a mobile station UE requiring low transmission power (for example, a mobile station performing VoIP or the like). This corresponds to a processing flow of "YES" at Step S404, then "NO" at Step 406, and then Step S408.

Alternatively, the base station eNB leaves the buffer resources unused. This corresponds to a processing flow of "NO" at Step S404, then "NO" at Step S406, and then Step S408.

Alternatively, the base station eNB allocates the buffer resources to a mobile station UE performing high-speed data transmission when an excessive-load indicator, such as a power control signal indicative of large interference, is not received. This corresponds to a processing flow of "NO" at Step S402, and then Step S408.

9. Operation of Third Exemplary Embodiment

According to the third exemplary embodiment of the present invention, buffer resources for another cell are determined based on RACH resource information on this another cell and based on a pattern that avoids continuous interference with this another cell.

Figure 14:
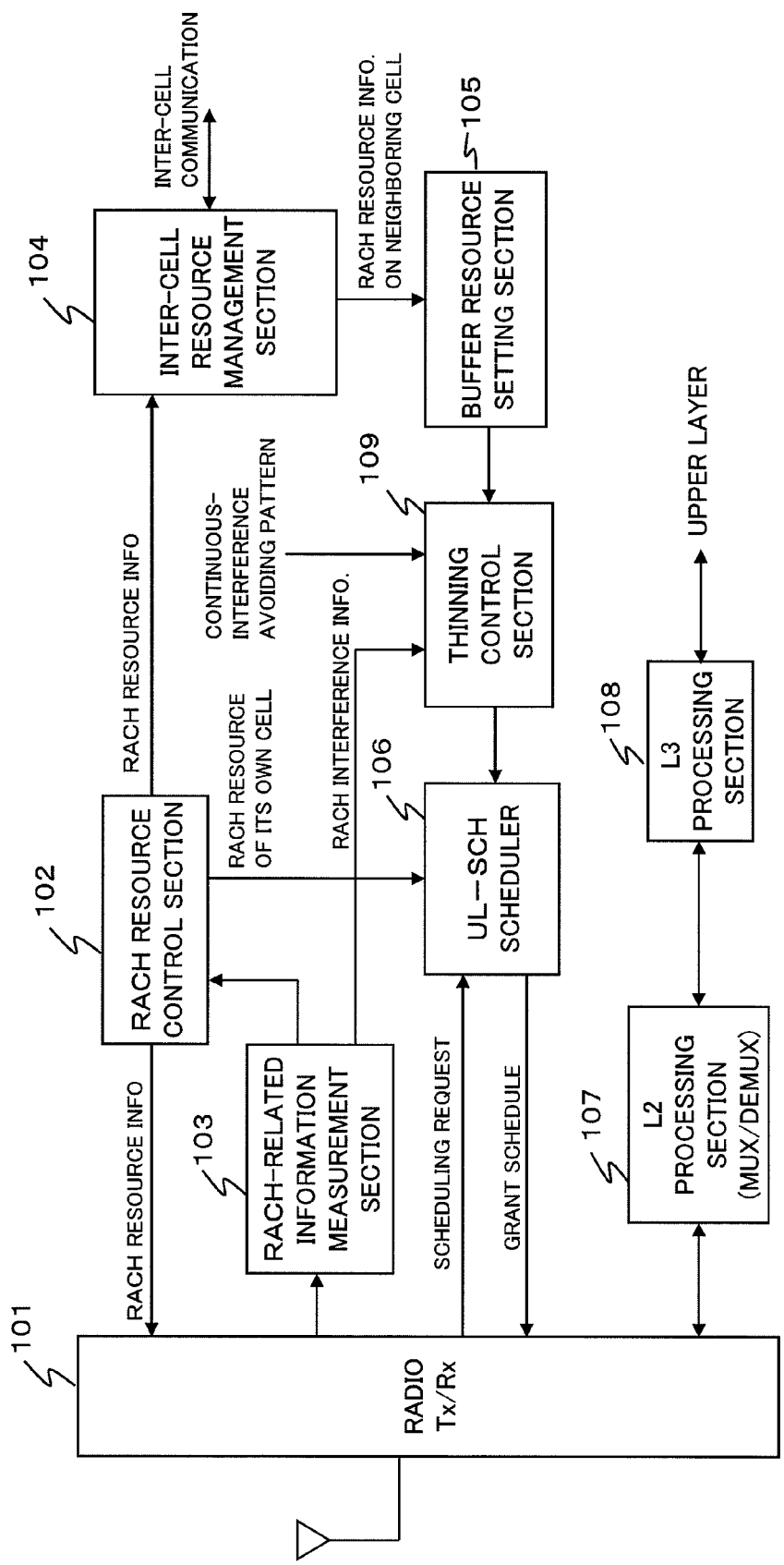
FIG. 14 is a block diagram showing a configuration of a radio communication device including a resource allocation control device according to the third exemplary embodiment of the present invention.

FIG. 14 is a block diagram showing a configuration of a radio communication device including a resource allocation control device according to the third exemplary embodiment of the present invention. Note that those blocks having the same functions as in the configuration shown in FIG. 9 are denoted by the same reference numerals as in FIG. 9. A different point of the configuration shown in FIG. 14 from the configuration shown in FIG. 9 is that a buffer resource candidate setting section 105 and a thinning control section 109 are provided. However, the buffer resource candidate setting section 105 shown in FIG. 14 and the buffer resource setting section 105 shown in FIG. 9 have the same functions and are therefore denoted by the same reference numeral. That is, a buffer resource candidate is equivalent to a buffer resource corresponding to a RACH resource of a neighboring cell.

The thinning control section 109 non-continuously excludes some of buffer resource candidates set by the buffer resource candidate setting section 105, by using a continuous-interference avoiding pattern that non-consecutively excludes some of the buffer resource candidates, and also using RACH interference information if needed. Buffer resources are created by thus decimating the buffer resource candidates and are output to the UL-SCH scheduler 106. Note that the continuous-interference avoiding pattern may be set in advance on each radio communication device as a setting file, or may be acquired and stored through an arbitrary network.

Figure 15:
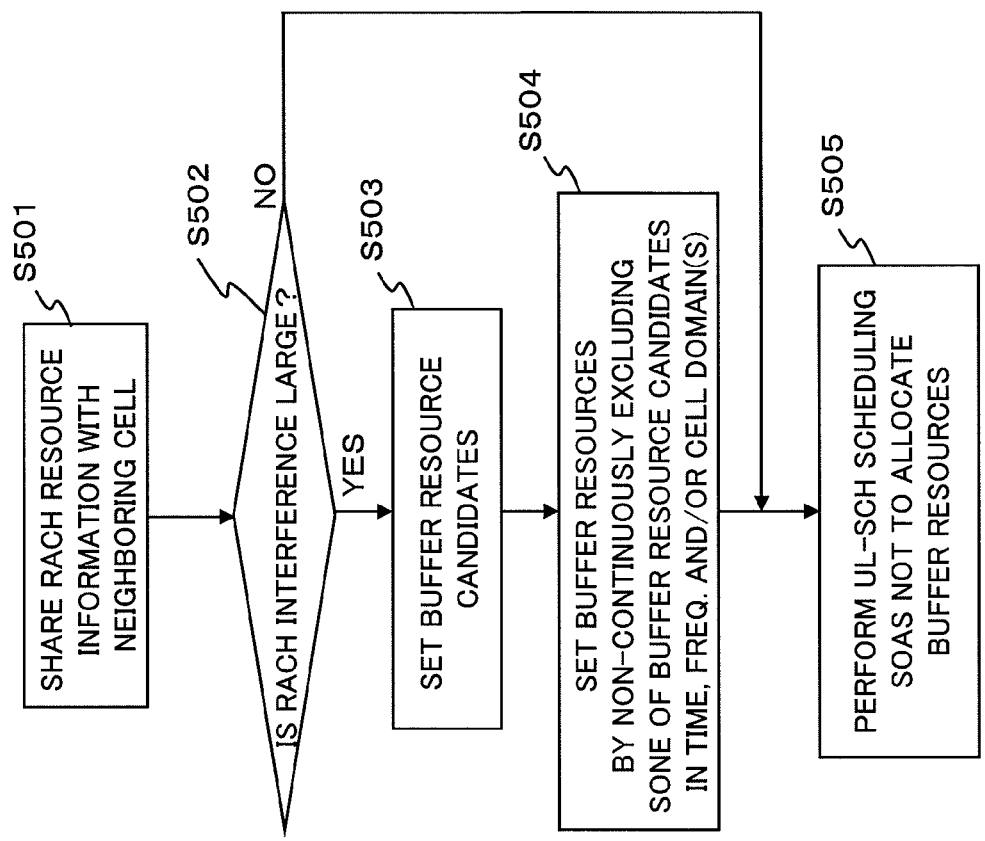
FIG. 15 is a flow chart showing the resource allocation control method according to the third exemplar embodiment of the present invention.

FIG. 15 is a flow chart showing the resource allocation control method according to the third exemplary embodiment of the present invention. Base stations eNB respectively controlling neighboring cells share RACH resource information on the respective cells with each other, by each base station eNB reporting, through the RACH resource control section 102, RACH scheduling information and currently occupied RACH resources to the other base station eNB (Step S501). Subsequently, the buffer resource candidate setting section 105 of each base station eNB determines whether or not the level of RACH interference obtained from the RACH-related information measurement section 103 is larger than a predetermined threshold value (Step S502). When the level of RACH interference is larger (Step S502: YES), the buffer resource candidate setting section 105 sets buffer resource candidates based on the RACH resource information on the neighboring cell and outputs the buffer resource candidates to the thinning control section 109 (Step S503).

The thinning control section 109 excludes some of the buffer resource candidates in the time domain, frequency domain, and/or cell domain, in accordance with the continuous-interference avoiding pattern and thereby determines buffer resources for the neighboring cell (Step S504). The thus-set buffer resources are output to the UL-SCH scheduler 106. Each of the base stations eNB controlling the respective cells can determine what pattern to use autonomously or by exchanging information with the other station. As mentioned earlier, a preferable example of the continuous-interference avoiding pattern is a random pattern.

The UL-SCH scheduler 106 performs scheduling so as not to allocate the buffer resources to UL-SCH transmission, that is, so as to allocate to UL-SCH transmission other resources than the buffer resources and than the RACH resources of its own cell (Step S505). If the level of RACH interference is smaller (Step S502: NO), the UL-SCH scheduler 106 performs scheduling so as to allocate other resources than the RACH resources of its own cell to UL-SCH transmission, without setting buffer resources (Step 505).

An example will be shown below in which a random pattern is used as the continuous-interference avoiding pattern for the above-described resource allocation control. First, a base station eNB controlling a cell shares the locations of RACH resources in the time and frequency domains, with a base station eNB controlling a neighboring cell. The allocation of the buffer resources corresponding to the RACH resources of the neighboring cell is performed so as to:

a) avoid consecutive interference with the other cell, in accordance with a random pattern in the time domain;

b) avoid persistent interference with the other cell, in accordance with a random pattern in the frequency domain;

c) avoid continuous interference with the other cell, in accordance with a random pattern in the cell domain; or d) avoid continuous interference with the other cell, in accordance with a random pattern in an arbitrary combination of the time, frequency, and cell domains.

The present invention can be applied to radio communications systems in which inter-cell interference can occur and, particularly, to mobile communications systems using an access scheme (FTDMA) based on a frequency-divided and time-divided resource structure.

10. Various Aspects

An object of the present invention is to solve the above-described problem and to provide a resource allocation control method and device that can reduce inter-cell interference.

Another object of the present invention is to provide a resource allocation control method and device and a radio communication device that can reduce a delay in starting communication.

A method for controlling resource allocation in a plurality of cells, includes the steps of: at each of radio communication devices which control at least two cells, receiving information of resources for control used in another cell from its radio communication device; and setting buffer resources in a predetermined resource area of its own cell, wherein each buffer resource is located corresponding to a resource for control used in the other cell.

A device for controlling resource allocation for each of a plurality of cells, includes: an inter-cell resource manager for communicating with at least one other cell by transmitting and receiving information of resources for control used in its own cell and the other cell; and a buffer resource setting section for setting buffer resources in a predetermined resource area of its own cell, wherein each buffer resource is located corresponding to a resource for control used in the other cell.

A radio communication device for controlling a cell in a radio communications system having a plurality of cells, includes: an inter-cell resource manager for communicating with at least one other cell by transmitting and receiving information of resources for control used in its own cell and the other cell; and a buffer resource setting section for setting buffer resources in a predetermined resource area of its own cell, wherein each buffer resource is located corresponding to a resource for control used in the other cell.

A mobile communications system having a plurality of base stations controlling a plurality of cells; and a plurality of mobile stations communicable with each base station according to a predetermined resource structure, wherein each base station includes: an inter-cell resource manager for communicating with at least one other cell by transmitting and receiving information of resources for control used in its own cell and the other cell; and a buffer resource setting section for setting buffer resources in a predetermined resource area of its own cell, wherein each buffer resource is located corresponding to a resource for control used in the other cell.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method for controlling resource allocation in a plurality of cells, comprising:
at each of radio communication devices which control at least two cells,
receiving information of resources for control used in another cell from its radio communication device;
setting buffer resources in a predetermined resource area of its own cell, wherein a buffer resource is located at a resource location in the predetermined resource area, the resource location corresponding to a resource for control used in the other cell; and
limiting usage of each buffer resource for data transmission so as to reduce interference to a corresponding resource for random access channel (RACH) transmission used in the other cell, wherein the buffer resource is not allocated to an uplink data transmission, wherein a resource other than the buffer resource in the predetermined resource area is allocated to the uplink data transmission.

2. The method according to claim 1, wherein the radio communication device suppresses allocation of a buffer resource to an information transmission request in the cell of its own.

3. The method according to claim 2, wherein the radio communication device does not allocate the buffer resource to the information transmission request.

4. The method according to claim 2, wherein the radio communication device allows allocation of the buffer resource to the information transmission request based on a degree of interference of the information transmission to another cell.

5. The method according to claim 4, wherein the information transmission with allowable interference to another cell is information transmission of a type such that a frequency band of transmission is lower than a predetermined frequency.

6. The method according to claim 4, wherein the information transmission with allowable interference to another cell is information transmission which is performed by a radio transceiver terminal with path loss to another cell being higher than a predetermined level.

7. The method according to claim 1, wherein the buffer resources are set by:

setting buffer resource candidates in the predetermined resource area of its own cell, wherein each buffer resource candidate is located corresponding to a resource for control used in the other cell; and
thinning the buffer resource candidates according to a non-continuous pattern to produce the buffer resources.

8. The method according to claim 7, wherein the buffer resources are set at a rate such that at least one resource is included in a predetermined period of time.

9. The method according to claim 7, wherein the non-continuous pattern is set for each of other cells.

10. A device for controlling resource allocation for each of a plurality of cells, comprising:
an inter-cell resource manager for communicating with at least one other cell by transmitting and receiving information of resources for control used in its own cell and the other cell;
a buffer resource setting section for setting buffer resources in a predetermined resource area of its own cell, wherein a buffer resource is located at a resource location in the predetermined resource area, the resource location corresponding to a resource for control used in the other cell; and
a communication section for limiting usage of each buffer resource for data transmission so as to reduce interference to a corresponding resource for random access channel (RACH) transmission used in the other cell, wherein the buffer resource is not allocated to an uplink data transmission, wherein a resource other than the buffer resource in the predetermined resource area is allocated to the uplink data transmission.

11. The device according to claim 10, further comprising an information-transmission resource allocation section suppresses allocation of a buffer resource to an information transmission request in the cell of its own.

12. The device according to claim 11, wherein the information-transmission resource allocation section does not allocate the buffer resource to the information transmission request.

13. The device according to claim 11, wherein the information-transmission resource allocation section allows allocation of the buffer resource to the information transmission request based on a degree of interference of the information transmission to another cell.

14. The device according to claim 13, wherein the information transmission with allowable interference to another cell is information transmission of a type such that a frequency band of transmission is lower than a predetermined frequency.

15. The device according to claim 13, wherein the information transmission with allowable interference to another cell is information transmission which is performed by a radio transceiver terminal with path loss to another cell being higher than a predetermined level.

16. The device according to claim 10, wherein the buffer resource setting section comprises:
a buffer resource candidate setting section for setting buffer resource candidates in the predetermined resource area of its own cell, wherein each buffer resource candidate is located corresponding to a resource for control used in the other cell; and
a thinning controller for thinning the buffer resource candidates according to a non-continuous pattern to produce the buffer resources.

17. The device according to claim 16, wherein the buffer resources are set at a rate such that at least one resource is included in a predetermined period of time.

18. The device according to claim 16, wherein the non-continuous pattern is set for each of other cells.

19. A radio communication device for controlling a cell in a radio communications system having a plurality of cells, comprising:
an inter-cell resource manager for communicating with at least one other cell by transmitting and receiving information of resources for control used in its own cell and the other cell;
a buffer resource setting section for setting buffer resources in a predetermined resource area of its own cell, wherein a buffer resource is located at a resource location in the predetermined resource area, the resource location corresponding to a resource for control used in the other cell; and
a communication section for limiting usage of each buffer resource for data transmission so as to reduce interference to a corresponding resource for random access channel (RACH) transmission used in the other cell, wherein the buffer resource is not allocated to an uplink data transmission, wherein a resource other than the buffer resource in the predetermined resource area is allocated to the uplink data transmission.

20. The radio communication device according to claim 19, further comprising an information-transmission resource allocation section suppresses allocation of a buffer resource to an information transmission request in the cell of its own.

21. A mobile communications system comprising a mobile station communicable with a radio communication device in accordance with a predetermined resource structure, the system comprising:
the radio communication device comprises:
an inter-cell resource manager for communicating with at least one other cell by transmitting and receiving information of resources for control used in its own cell and the other cell;
a buffer resource setting section for setting buffer resources in a predetermined resource area of its own cell, wherein each buffer resource is located corresponding to a resource for control used in the other cell; and
an information-transmission resource allocation section suppresses allocation of a buffer resource to an information transmission request in the cell of its own,
the mobile station comprising:
a first controller for transmitting a control signal using a resource for control in a cell controlled by the radio communication device;
a second controller for transmitting an information transmission request to the radio communication device and, using a resource for information transmission allocated by the radio communication device as a response to the information transmission request to transmit information to the radio communication device;
a path-loss measurement section for measuring a path loss to a cell different from the cell controlled by the radio communication device; and
a third controller for notifying the radio communication device of the path-loss information to the other cell,
wherein the information-transmission resource allocation section of the radio communication device performs resource allocation control for the information transmission request based on the path-loss information.

22. A mobile communications system having a plurality of base stations controlling a plurality of cells; and a plurality of mobile stations communicable with each base station according to a predetermined resource structure, wherein each base station comprises:
an inter-cell resource manager for communicating with at least one other cell by transmitting and receiving information of resources for control used in its own cell and the other cell;
a buffer resource setting section for setting buffer resources in a predetermined resource area of its own cell, wherein a buffer resource is located at a resource location in the predetermined resource area, the resource location corresponding to a resource for control used in the other cell; and
a communication section for limiting usage of each buffer resource for data transmission so as to reduce interference to a corresponding resource for random access channel (RACH) transmission used in the other cell, wherein the buffer resource is not allocated to an uplink data transmission, wherein a resource other than the buffer resource in the predetermined resource area is allocated to the uplink data transmission.

23. The mobile communications system according to claim 22, wherein the base station further comprises an information-transmission resource allocation section suppresses allocation of a buffer resource to an information transmission request in the cell of its own.

24. A computer-readable program recorded on a non-transitory medium, the program instructing a computer to function as a device for controlling resource allocation for each of a plurality of cells, comprising:
an inter-cell resource manager communicating with at least one other cell by transmitting and receiving information of resources for control used in its own cell and the other cell;
a buffer resource setting section setting buffer resources in a predetermined resource area of its own cell, wherein a buffer resource is located at a resource location in the predetermined resource area, the resource location corresponding to a resource for control used in the other cell; and
a communication section for limiting usage of each buffer resource for data transmission so as to reduce interference to a corresponding resource for random access channel (RACH) transmission used in the other cell, wherein the buffer resource is not allocated to an uplink data transmission, wherein a resource other than the buffer resource in the predetermined resource area is allocated to the uplink data transmission.

\* \* \* \* \*